United States Patent [19]
Batik

[11] 3,763,991
[45] Oct. 9, 1973

[54] PRODUCT CONVEYOR SYSTEM

[76] Inventor: Otto J. Batik, 1919 S. Harlem Ave., Berwyn, Ill. 60402

[22] Filed: Apr. 27, 1972

[21] Appl. No.: 248,313

[52] U.S. Cl. ................................................ 198/85
[51] Int. Cl. .............................................. B65g 37/00
[58] Field of Search ..................................... 198/85

[56] References Cited
UNITED STATES PATENTS

| | | | |
|---|---|---|---|
| 1,635,406 | 7/1927 | Greer | 198/85 |
| 1,811,545 | 6/1931 | Goddard | 198/85 X |

Primary Examiner—Edward A. Sroka
Attorney—Alberts, Brezina & Lund

[57] ABSTRACT

Product conveyor system wherein a plurality of separate product carriers are provided in the form of generally flat rectangular grates. Each carrier is moved by an upward shuttle from a lowermost station of a first stack and thence through a plurality of intermediate stations to an uppermost station of the first stack, thence by a first transverse shuttle to the uppermost station of a second stack, thence by downward shuttle through a plurality of intermediate stations to a lowermost station of the second stack and thence by a second transverse shuttle back to the lowermost station of the first stack. Loading and unloading conveyors deliver and receive products to and from the lowermost carriers of the first and second stacks. Important features relate to the construction and operation of the shuttles and to the delivery of the product from the loading conveyor and to the unloading conveyor.

23 Claims, 44 Drawing Figures

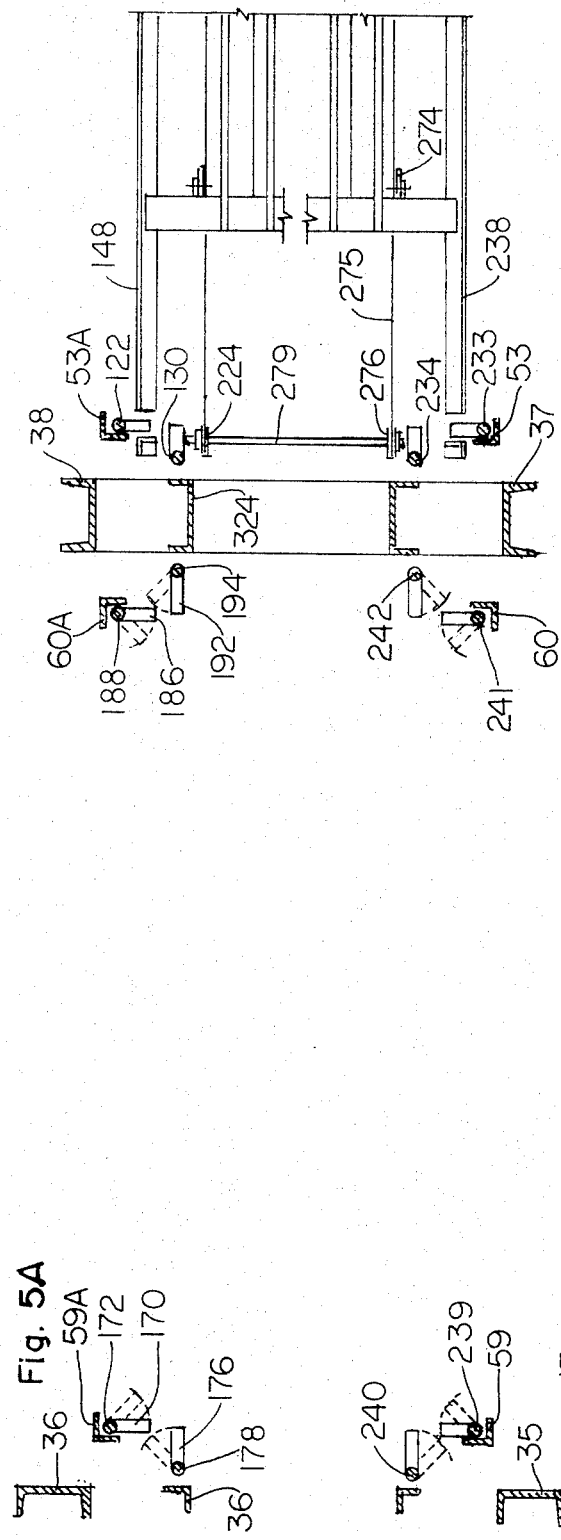
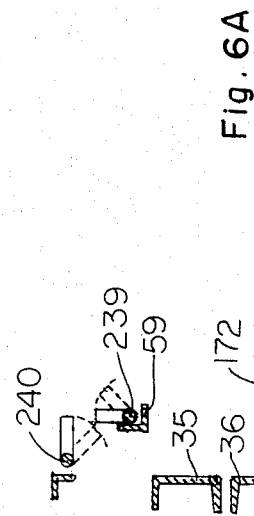
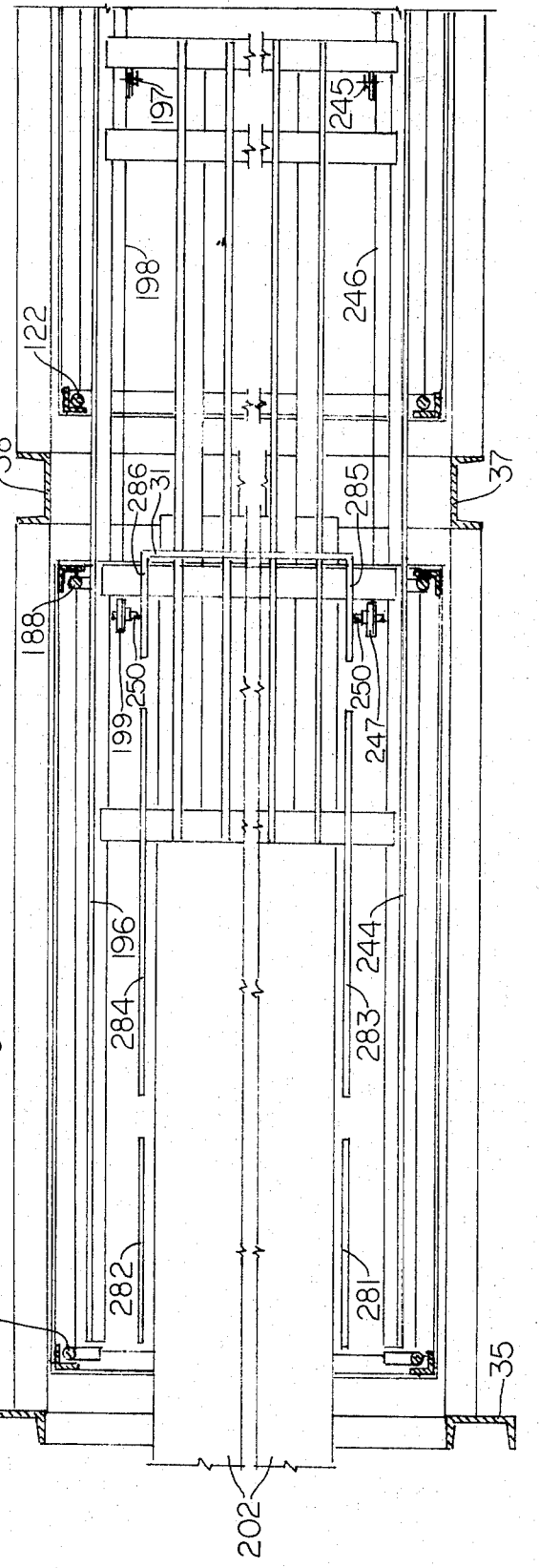

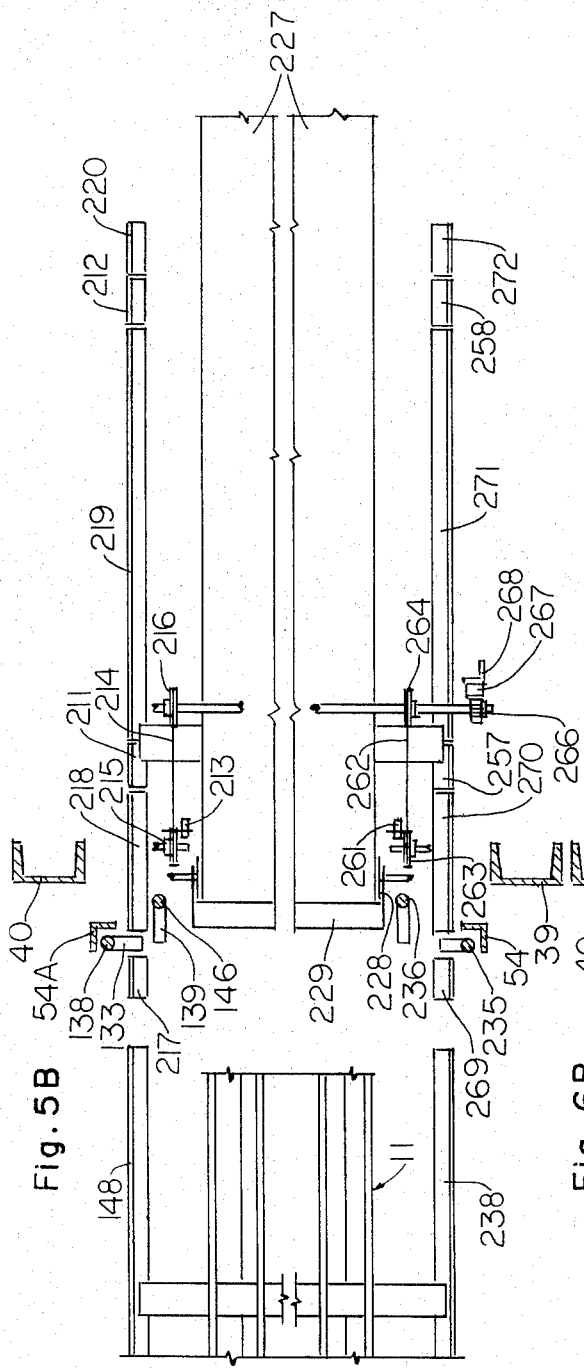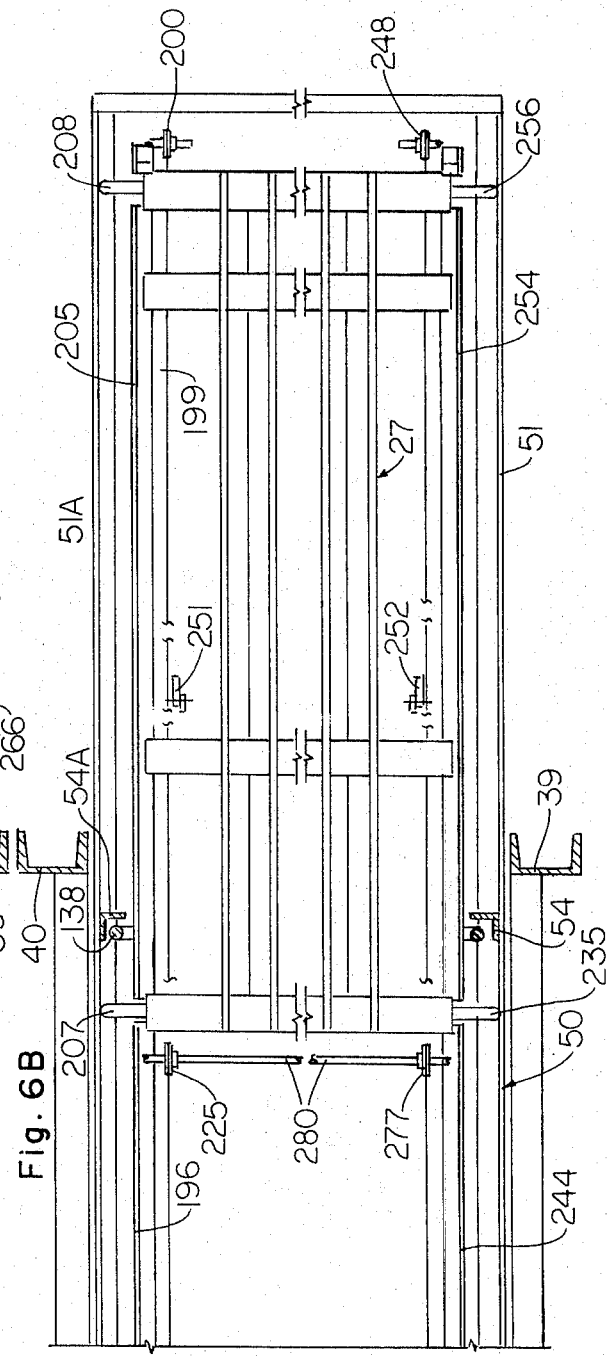

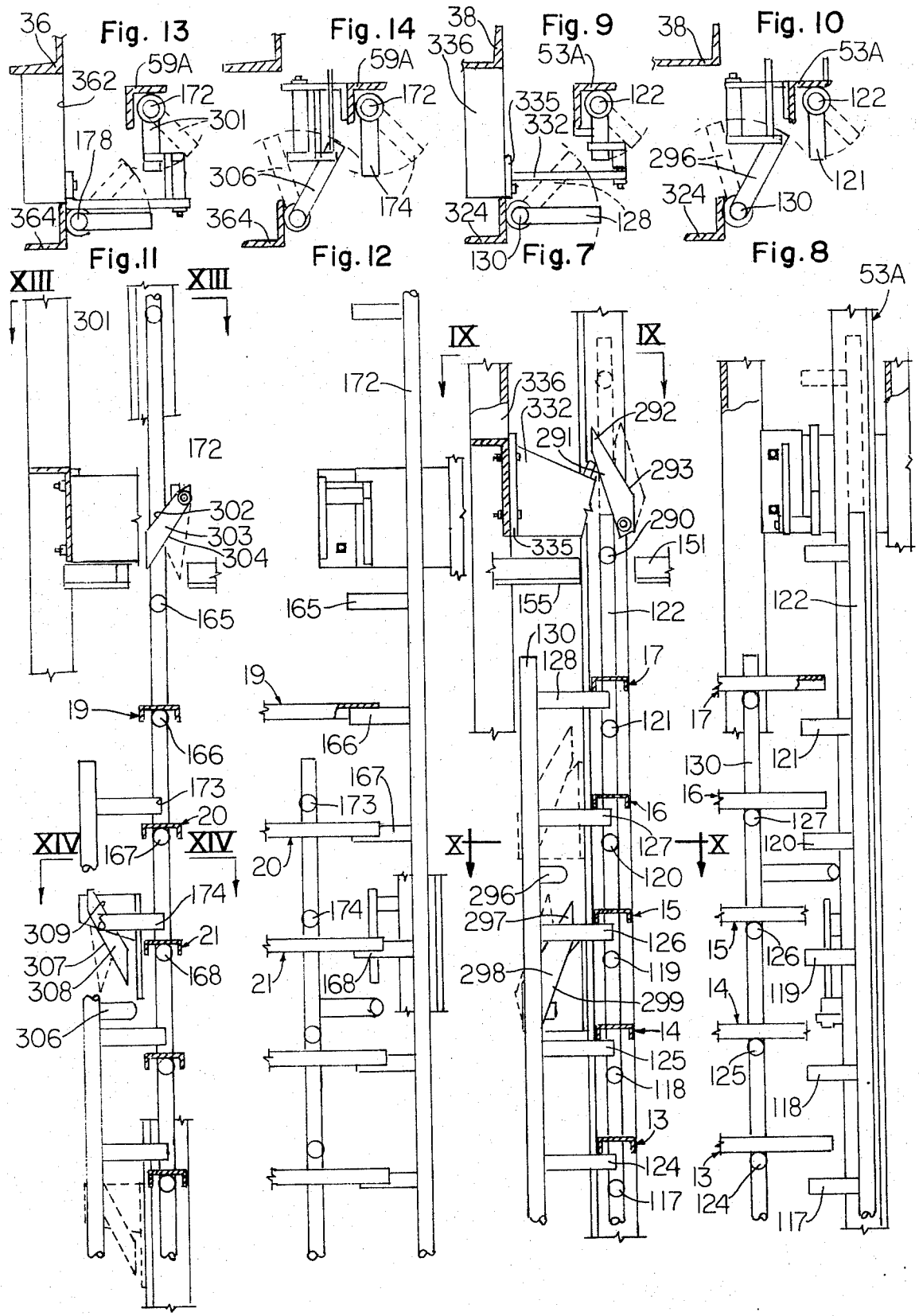

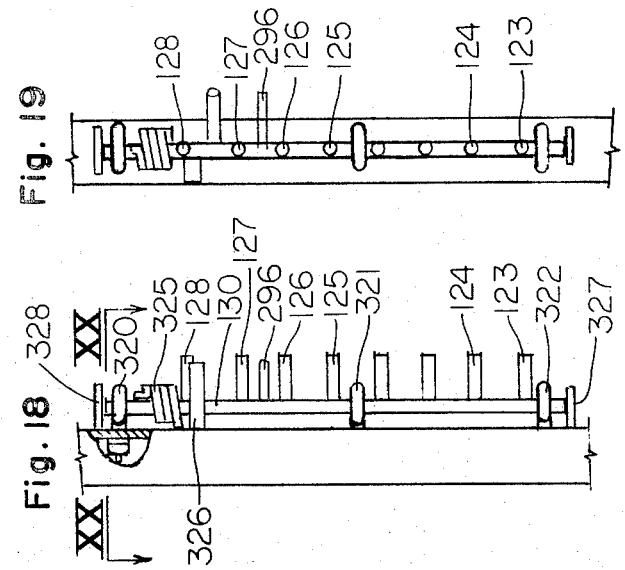
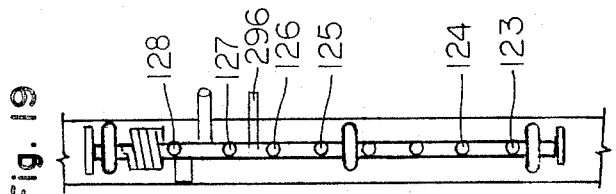
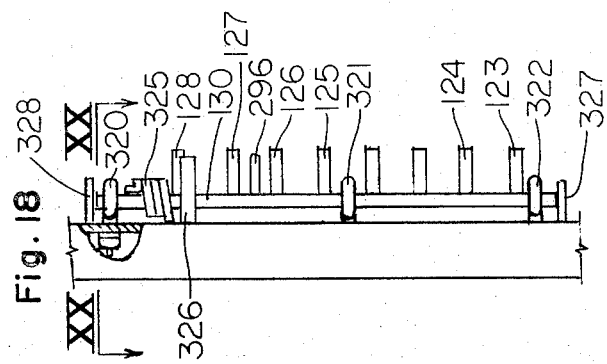
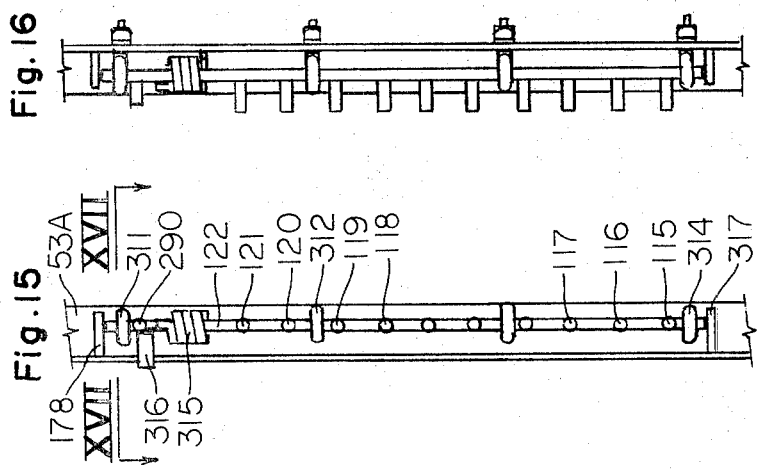

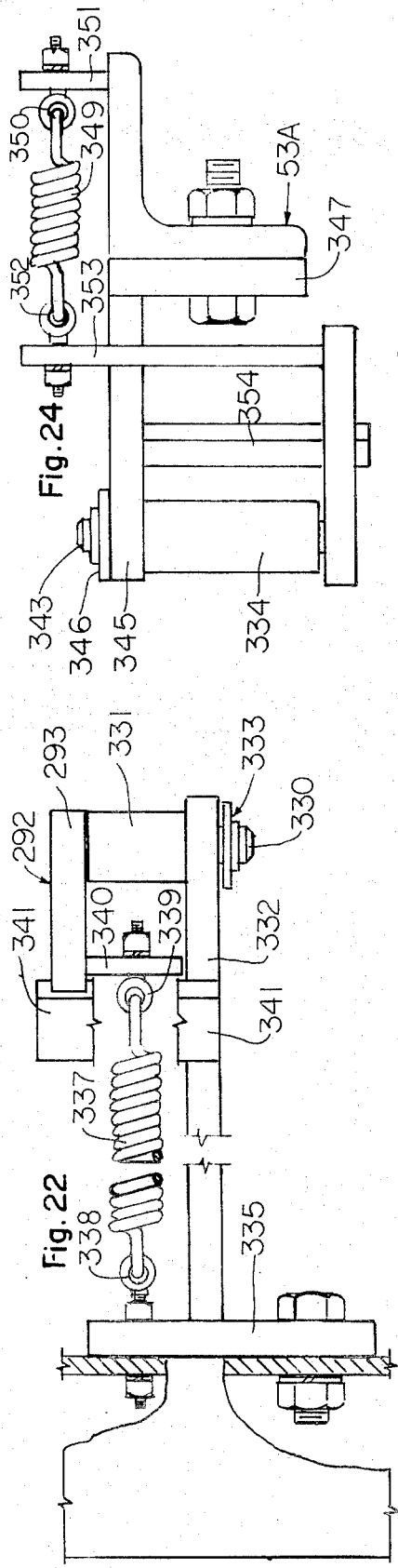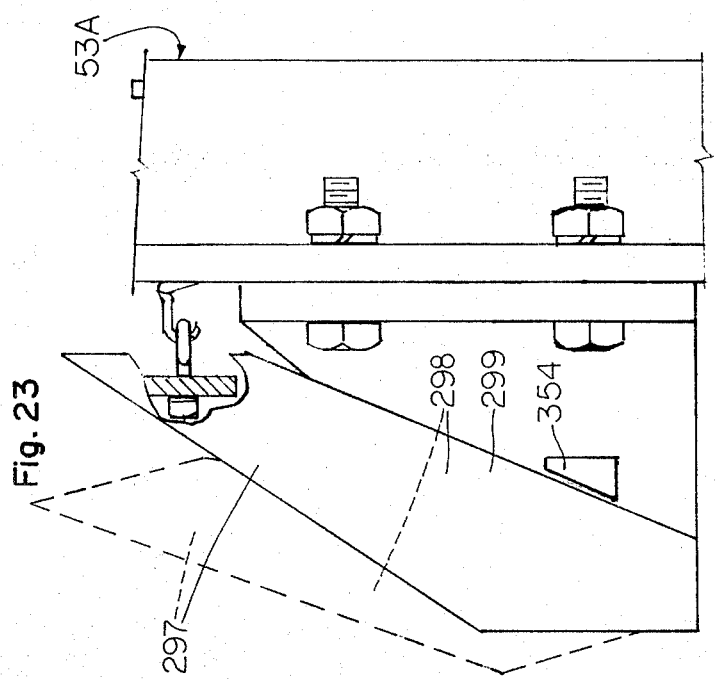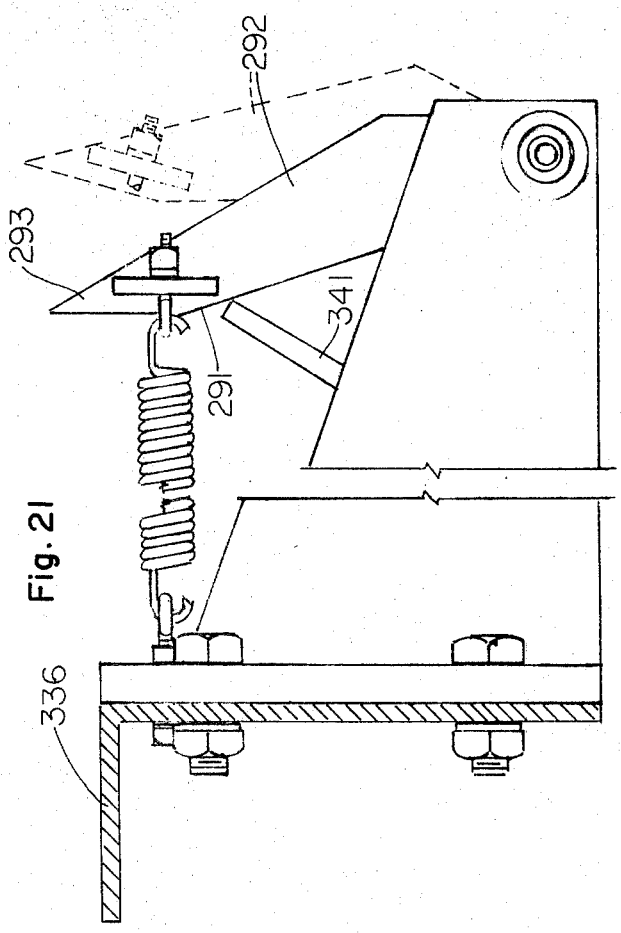

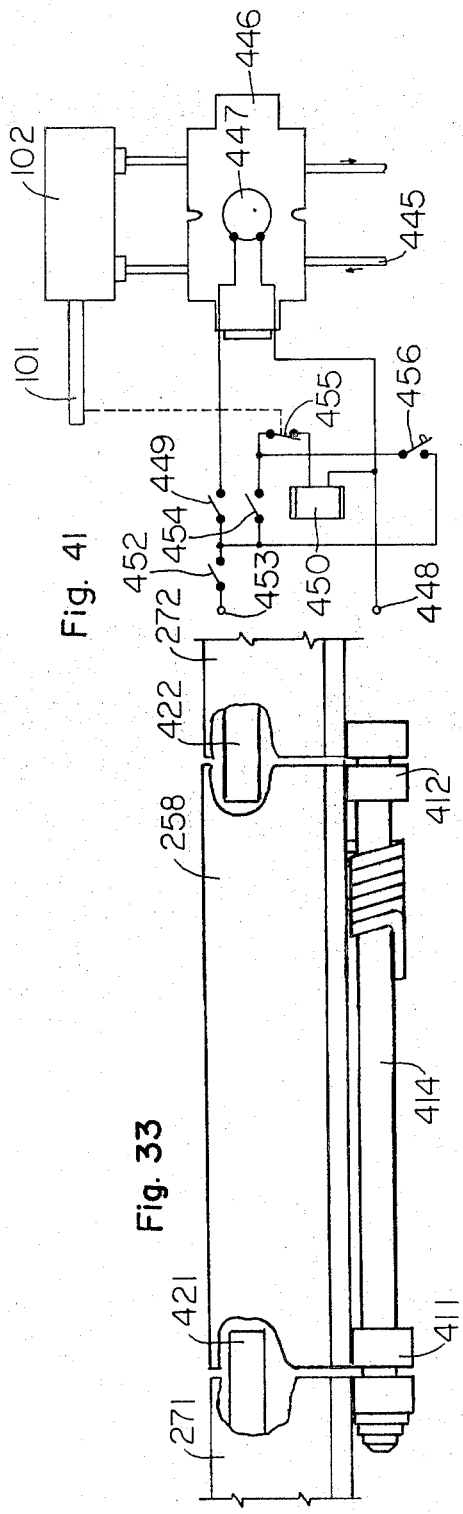
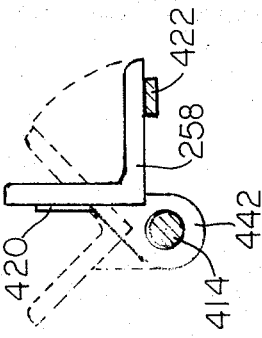
Fig. 41
Fig. 35
Fig. 33
Fig. 34

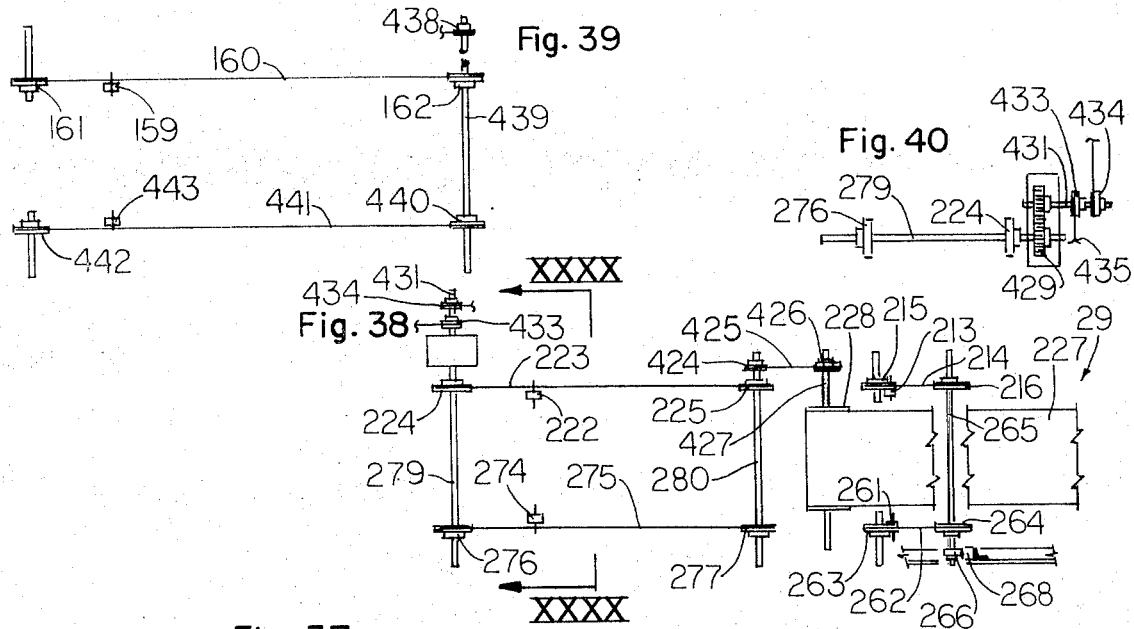
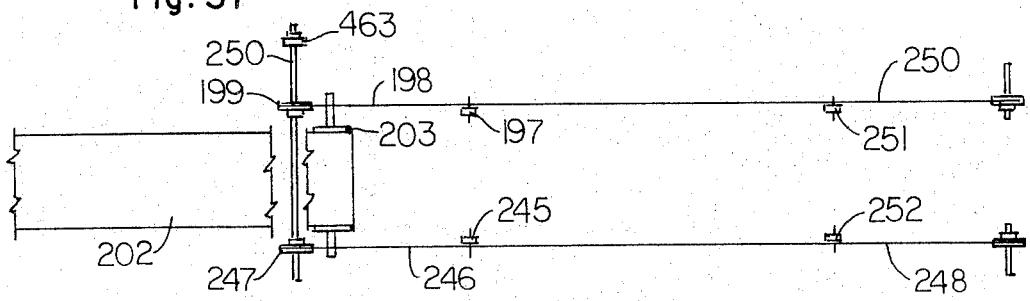
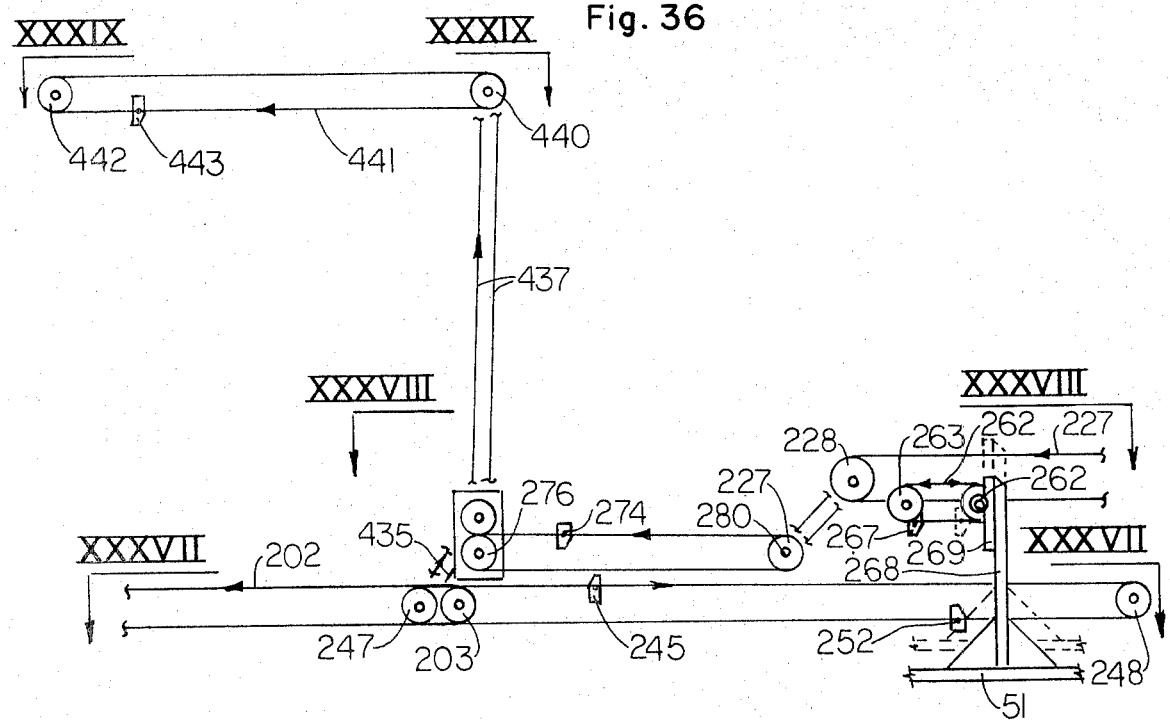

PRODUCT CONVEYOR SYSTEM

This invention relates to a product conveyor system and more particularly to a compact system in which a large quantity of a product can be positioned in a space of minimum dimensions while the product is continuously delivered at relatively high speed to and from the system. The system is readily and economically constructed while being rugged, durable and highly reliable and is usable in a wide variety of applications.

Many product processing applications require that a product be conveyed to and from a processing or storage region in which it may stay for a substantial length of time. By way of example, in the case of food products requiring baking or freezing, it is necessary that the product be kept in an oven or freezing chamber for a substantial length of time and it is, of course, desirable that a substantial quantity of the product be kept in the chamber in a compact manner while also allowing feeding of the product to and from the chamber at relatively high speeds.

In one type of prior art system, a spiral conveyor has been provided with the product being moved in a spiral path at a linear speed equal to the speed of loading and unloading conveyors. In another type, as exemplified by the Fooks Pat. No. 1,570,235, a conveyor is provided which is moved in a circuitous path. In a further type as exemplified by the Birdseye Pat. No. 2,228,998, a product is carried by rotating annular shelves, one above another, being rotated through one turn by each shelf and dropped to the next lower shelf. In still another type as exemplified by the Patterson Pat. No. 2,679,323, carriers are providing having a plurality of vertically spaced open ended shelves, each carrier being shifted downwardly to sequentially position the shelves therein between loading and unloading conveyors, thence horizontally through a plurality of positions, thence upwardly and thence horizontally through a plurality of positions back to the initial position. As the product is pushed into each shelf, the processed product is pushed out of the shelf to the unloading conveyor.

Such systems have a number of disadvantages including complexity and expense of construction, unreliability and the need for unduly large space requirements. They are also quite limited as to the type of product which can be handled in a system designed for one particular product is not suitable for products of substantially different character.

This invention was evolved with the general object of overcoming the disadvantages of prior art systems and of providing a system in which a large amount of a product can be compactly positioned in a space of minimum dimensions while the product is readily delivered to and received from the system at a high speed.

Another object of the invention is to provide a system which is readily and economically constructed while being highly reliable as well as rugged and durable.

A further object of the invention is to provide a system which is readily adaptable for handling a wide variety of types of products in a wide variety of processing and storage applications.

In accordance with this invention, a system is provided in which a plurality of separate product carriers are arranged in first and second stacks, each stack defining a plurality of vertically aligned product carrier positions including lowermost and uppermost positions and a plurality of intermediate positions. Upward shuttle means are associated with the first stack for simultaneously shifting all carriers thereof upwardly to the next higher position, upper transverse shuttle means are provided for shifting a carrier from the uppermost position of the first stack to the uppermost position of the second stack, downward shuttle means are provided for shifting the carriers in the second stack downwardly and lower transverse shuttle means are provided for shifting the carrier from the lowermost position of the second stack to the lowermost position of the first. With this arrangement, each carrier is moved in a circuitous path upwardly through the first stack transversely to the top of the second, downwardly through the second stack and transversely back to the initial position.

In accordance with important features, loading conveyor means deliver a product to a carrier in one position of the first stack while unloading conveyor means receive a product from a carrier in one position of the second stack. Preferably, the loading and unloading positions are in generally horizontal alignment and most preferably, they are the lowermost positions of the first and second stacks. Thus product is stored on all carriers except a carrier or carriers being transferred by the lower transverse shuttle.

According to a specific feature of the invention, each of the carriers defines support means substantially in a horizontal plane for underlying and supporting the product. Preferably, for product in the form of discrete separate items such as packages to be frozen, for example, each carrier is in the form of a gate.

Another important feature relates to the provision of means for effecting operation of the shuttle means periodically and in properly synchronized relation and with the time period between operations of the shuttle means being correlated to the speed of movement of the loading and unloading conveyors.

In accordance with a further feature, the lower transverse shuttle means includes means for bringing a carrier to a position in which product is received from the loading conveyor at one end of the carrier, the carrier being then moved at the same speed as the loading conveyor to receive the product along the surface thereof.

Additional important features of the invention relate to the construction and operation of the shuttle means and particularly the upward and downward shuttle means such that a rugged support for the carriers is obtained and such that the carriers are moved with a high degree of reliability without however requiring a complicated and expensive mechanism.

This invention contemplates other objects, features and advantages which will become more fully apparent from the following detailed description taken in conjunction with the accompanying drawings which illustrate a preferred embodiment and in which:

FIG. 2 is a top plan view of diagrammatic form which serves as a reference for location of various sectional views and which particularly illustrates support and actuating means for vertically reciprocable frames of upward and downward shuttle means;

FIG. 3 is a side elevational view of a diagrammatic form similar to FIG. 2, also particularly illustrating the support of the reciprocable shuttle frames;

Figures 2, 3:
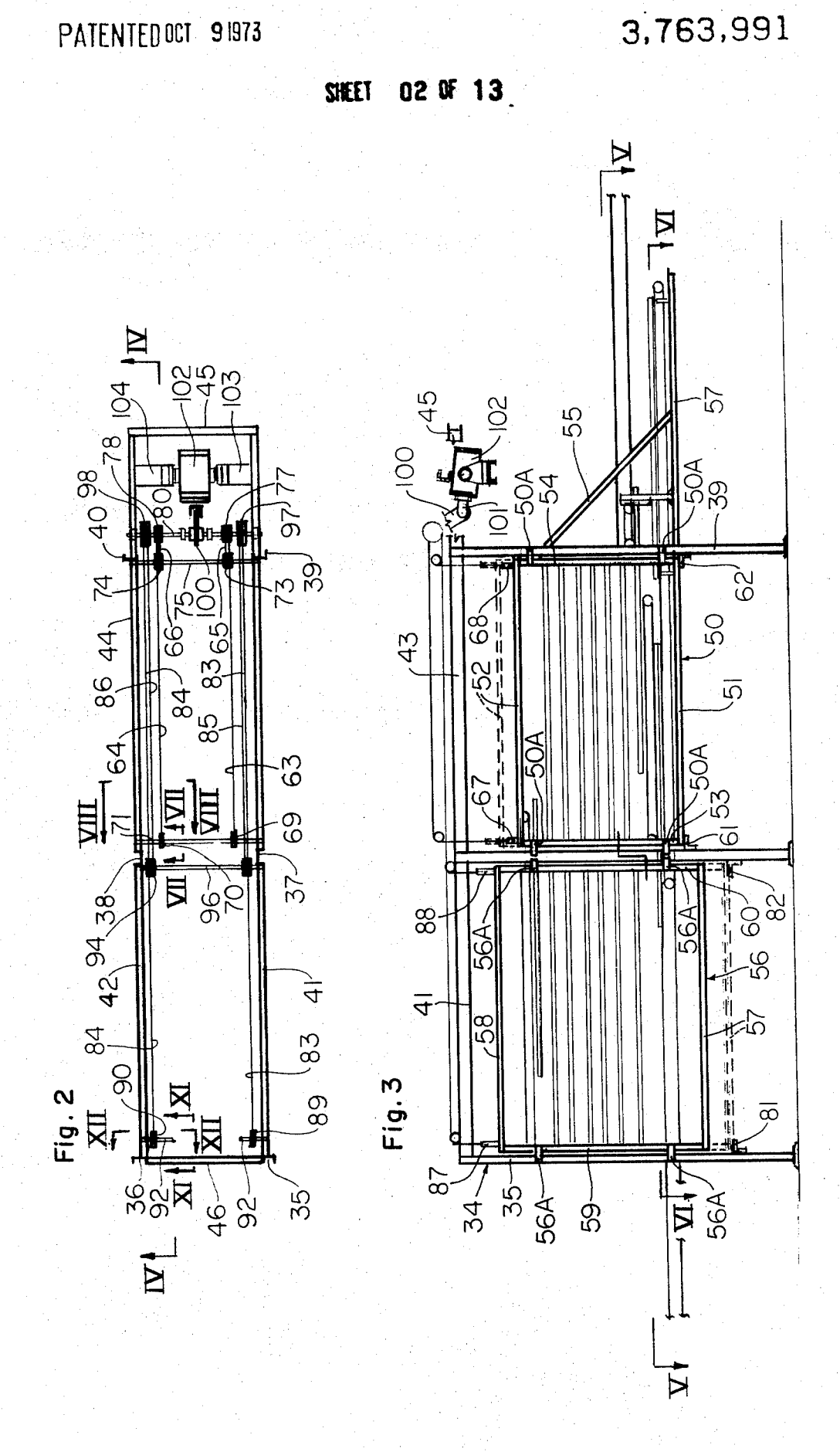
Figure 4A:
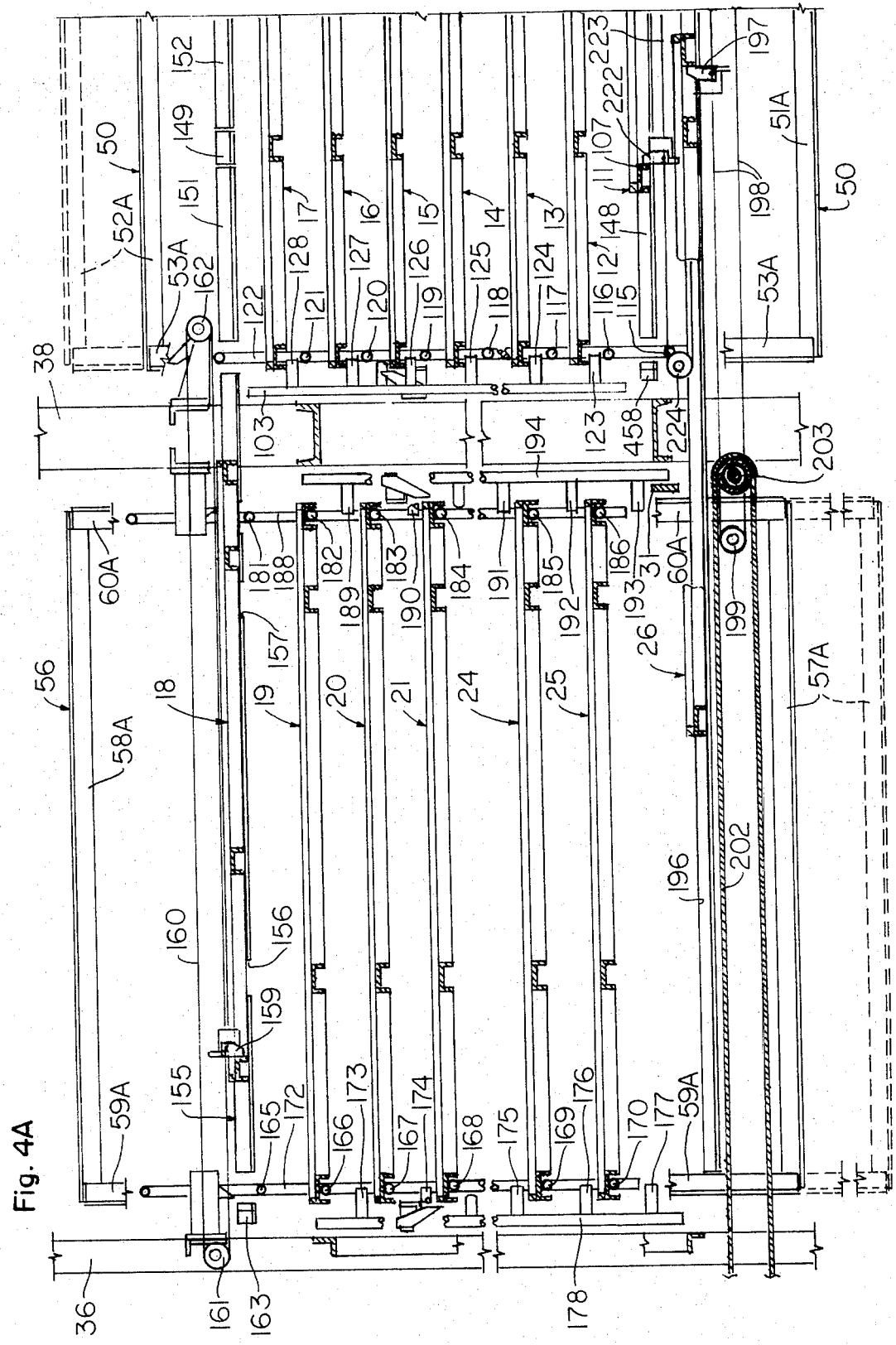
Figure 4B:
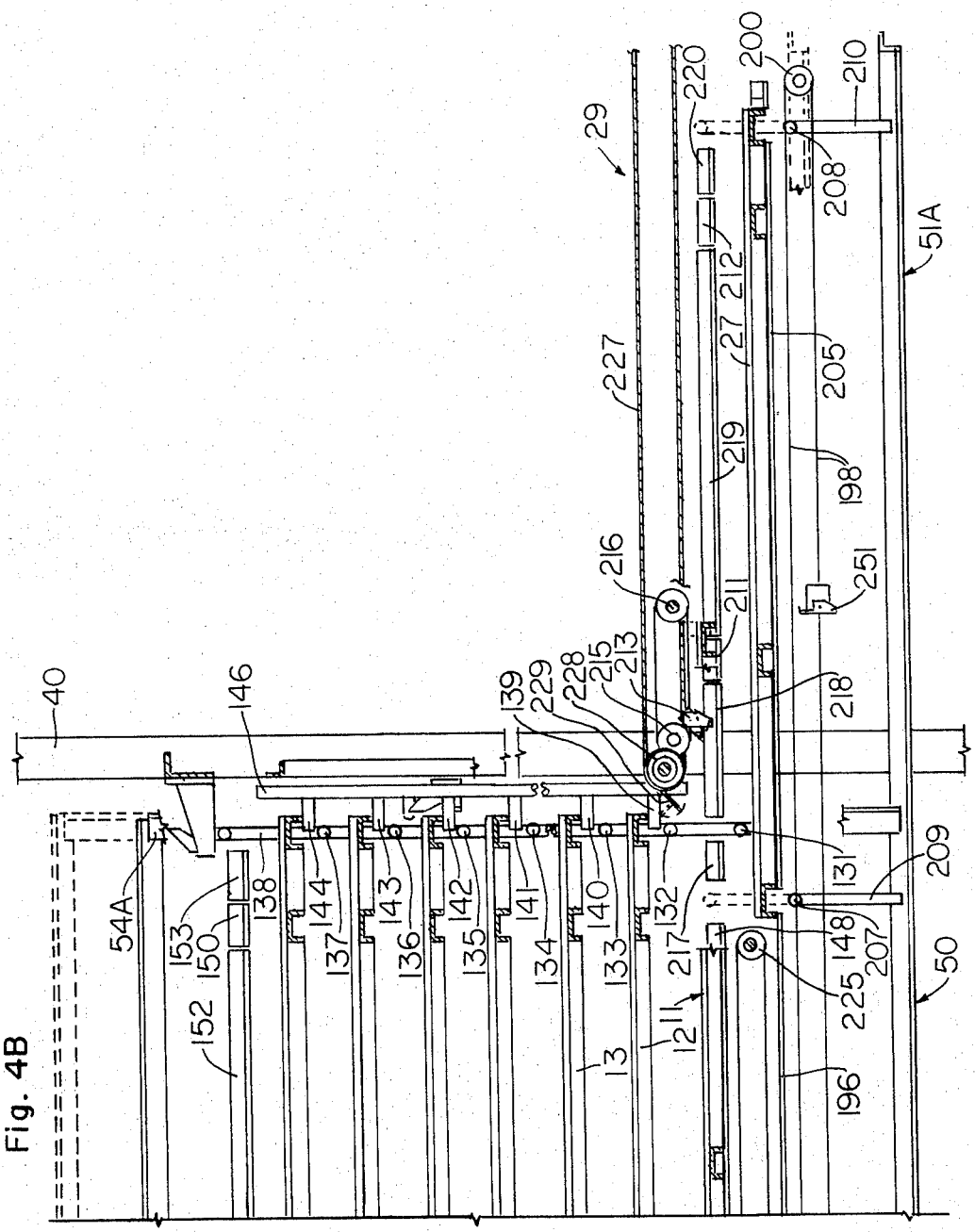
Figure 28:
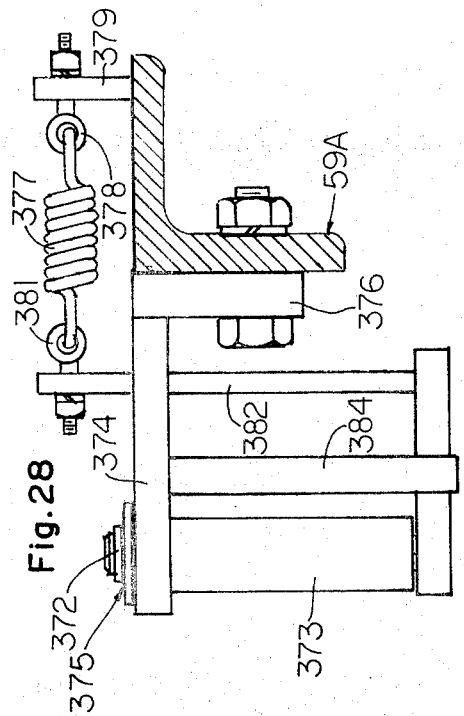
Figure 27:
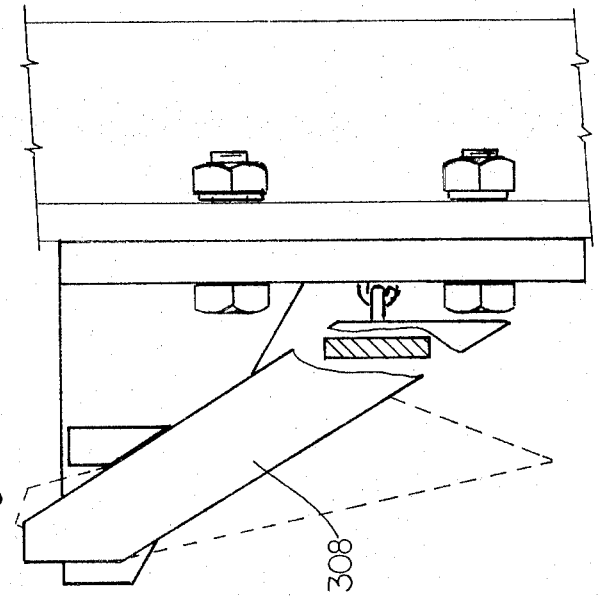
Figure 26:
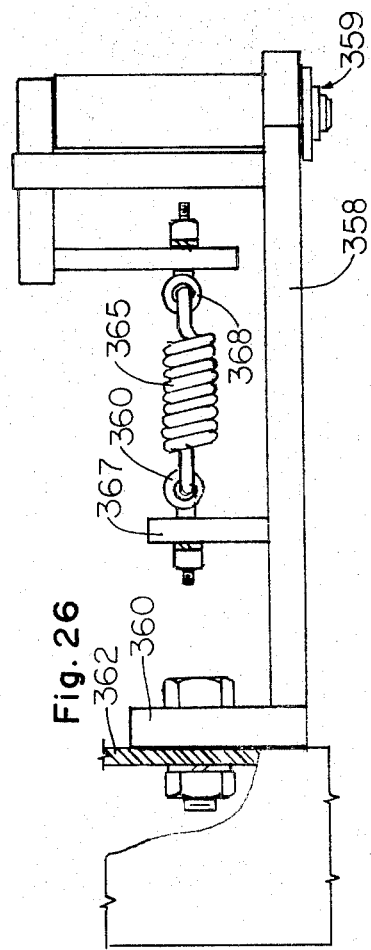
Figure 25:
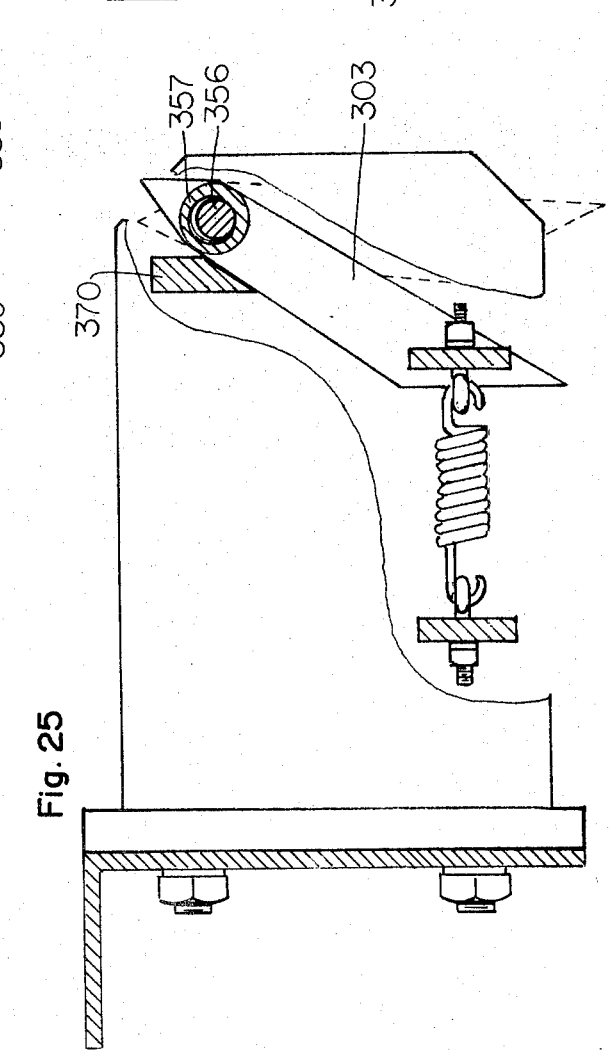
Figure 31:
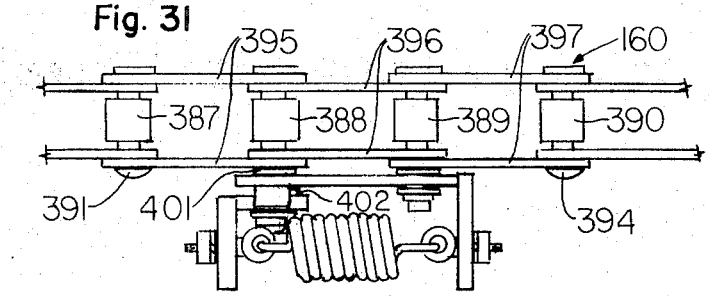
Figure 32:
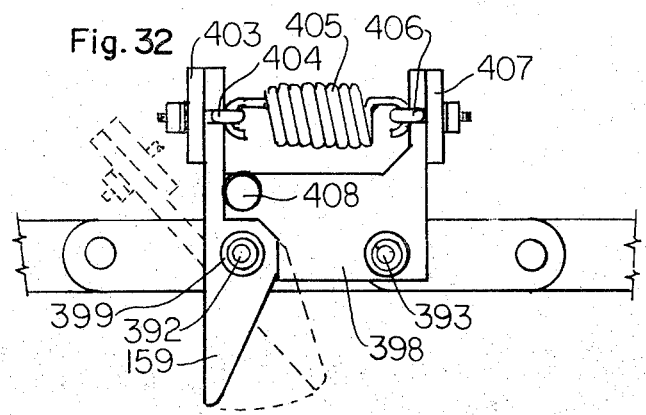
Figure 29:
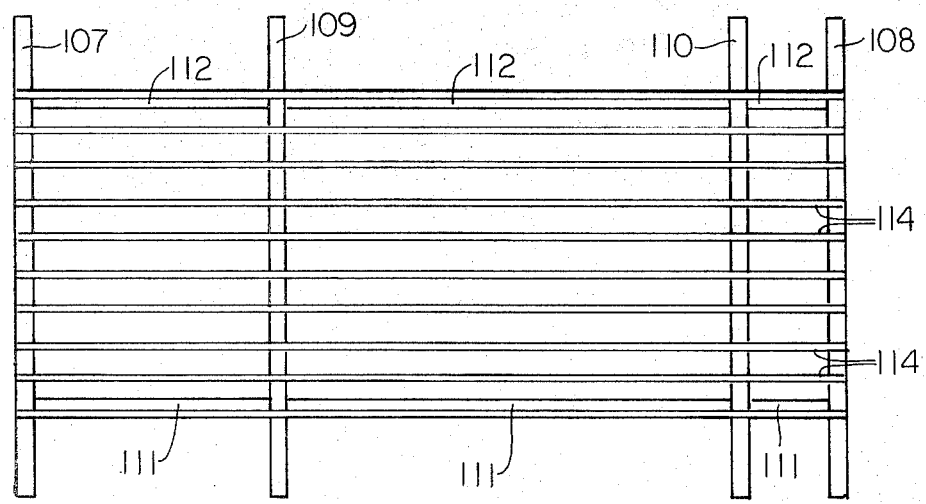
Figure 30:
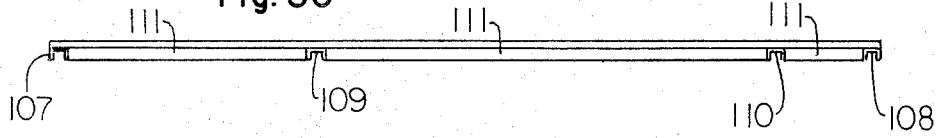

FIGS. 4A and 4B together form a cross-sectional view, taken substantially along line IV—IV of FIG. 2;

FIGS. 5A and 5B together form a sectional view taken substantially along line V—V of FIG. 3;

FIGS. 6A and 6B together form a sectional view taken substantially along line VI—VI of FIG. 3;

FIG. 7 is a sectional view taken substantially along line VII—VII of FIG. 2 and illustrating portions of an upward shuttle mechanism;

FIG. 8 is a sectional view taken substantially along line VIII—VIII of FIG. 2 and forming a side elevational view of the structure shown in FIG. 7;

FIG. 9 is a sectional view taken substantially along line IX—IX of FIG. 7 and illustrating the operation of a pilot finger of a lifting finger assembly;

FIG. 10 is a sectional view taken substantially along line X—X of FIG. 7 and illustrating the operation of a pilot finger of a station finger assembly;

FIG. 11 is a sectional view taken substantially along line XI—XI of FIG. 2 and illustrating portions of a downward shuttle mechanism;

FIG. 12 is a sectional view taken substantially along line XII—XII and forming a side elevational view of the structure shown in FIG. 11;

FIG. 13 is a sectional view taken substantially along line XIII—XIII of FIG. 11 and illustrating the operation of a pilot finger of a lowering finger assembly;

FIG. 14 is a sectional view taken substantially along line XIV—XIV of FIG. 11 and illustrating the operation of a pilot finger of a station finger assembly;

FIG. 15 is an elevational view of a portion of a lifting frame, illustrating the support of lifting fingers thereon;

FIG. 16 is a side elevational view of the structure shown in FIG. 15;

FIG. 17 is a sectional view taken substantially along line XVII—XVII of FIG. 15;

FIG. 18 is an elevational view showing the support of station fingers on the frame of the apparatus;

FIG. 19 is a side elevational view of the structure shown in FIG. 18;

FIG. 20 is a sectional view taken substantially along line XX—XX of FIG. 18;

FIG. 21 is a detail view, on an enlarged scale, illustrating the form and support of a cam which functions to operate pilot fingers of a lifting finger assembly;

FIG. 22 is a top plan view of the structure shown in FIG. 21;

FIG. 23 is a detail view, on an enlarged scale, illustrating in elevation the form and support of a cam used for operation of a pilot finger of a station finger assembly;

FIG. 24 is a top plan view of the structure shown in FIG. 23;

FIG. 25 is a detail view, on an enlarged scale, showing the form and support of a cam which operates a pilot finger for servicing fingers of the downward shuttle mechanism;

FIG. 26 is a top plan view of the structure as shown in FIG. 25;

FIG. 27 is a detail view, on an enlarged scale, showing the form and support of a cam which operates a pilot finger for station fingers of the downward shuttle mechanism;

FIG. 28 is a top plan view of the structure shown in FIG. 27;

FIG. 29 is a top plan view of one of the carriers in the system;

FIG. 30 is a side elevational view of the carrier as shown in FIG. 29;

FIG. 31 is a detail view, on an enlarged scale, showing in plan the support of a finger on a chain in a transverse shuttle mechanism;

FIG. 32 is a side elevational view of the structure shown in FIG. 31;

FIG. 33 is a detail view, on an enlarged scale, showing in plan a one-way gate device of a carrier support track permitting upward movement of the carrier therebeyond while preventing downward movement;

FIG. 34 is a side elevational view of the structure shown in FIG. 33;

FIG. 35 is a sectional view taken substantially along line XXXV—XXXV of FIG. 34;

FIG. 36 is a view illustrating diagrammatically the drive of shuttle chains in the system;

FIG. 37 is another diagrammatic view illustrating the unloading conveyor and empty great return shuttle chain, taken substantially along line XXXVII—XXXVII of FIG. 36;

FIG. 38 is another diagrammatic view illustrating the drive of loading and auxiliary shuttle chains from a loading conveyor, taken substantially along line XXXVIII—XXXVIII of FIG. 36;

FIG. 39 is a plan view illustrating the drive of upper cross-over shuttle chains, taken substantially along line XXXIX—XXXIX of FIG. 36;

FIG. 40 is a diagrammatic sectional view taken substantially along line XXXX—XXXX of FIG. 38; and FIG. 41 is a schematic diagram showing the energization of a solenoid valve for operation of an air cylinder of the system.

Figure 1:
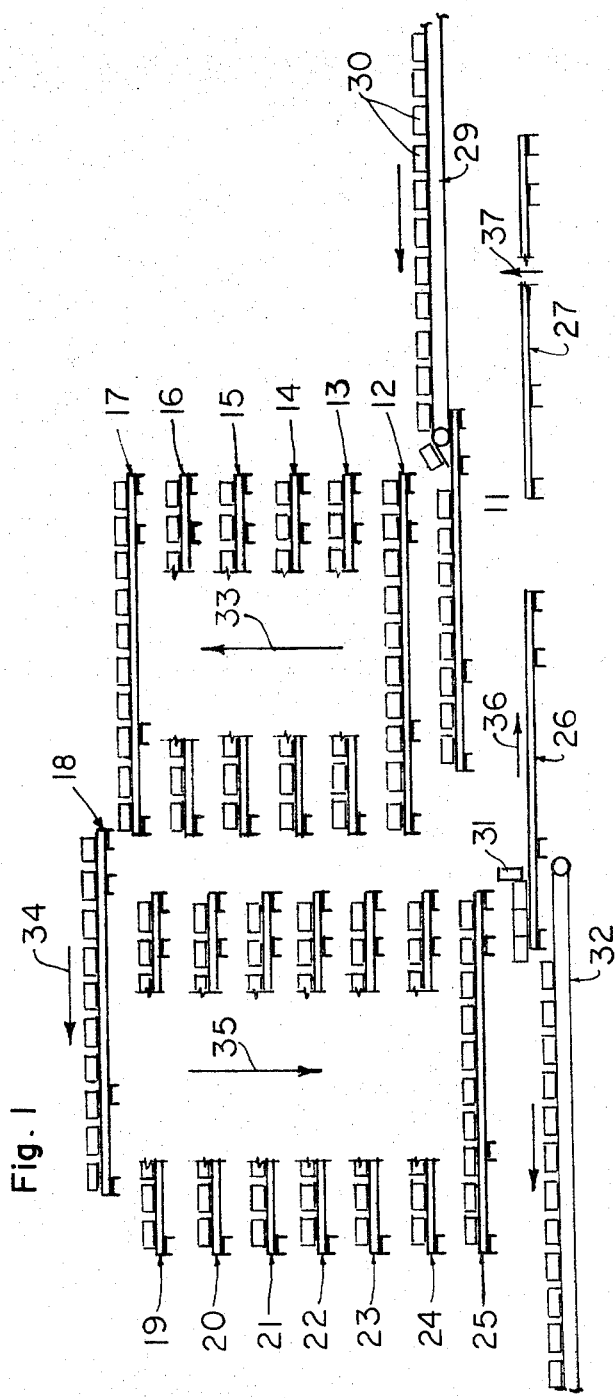
FIG. 1 is a view illustrating diagrammatically and schematically the movements of product and carriers in a system constructed in accordance with the invention.

Referring to FIG. 1, reference numeral 10 generally designates a conveyor system constructed in accordance with the principles of the invention. The system 10 comprises a plurality of product carriers, 17 carriers 11–27 being provided in the illustrated system. It will be understood that a lesser or greater number of carriers may be provided, according to requirements.

Each of the carriers 11–27 may be in the form of a grate structure as hereinafter described, in connection with FIGS. 29 and 30, and each defines support means in a horizontal plane for underlying and supporting a product. First and second stack means, as also described hereinafter are provided, each arranged for supporting a plurality of the carriers and each defining a plurality of vertically aligned product carrier positions or stations. As shown in FIG. 1, the carrier 11 is moving into a lowermost position or station of the first stack means, the carriers 12–17 are in intermediate stations of the first stack means, the carrier 18 is moving transversely from the uppermost station of the first stack to the uppermost station of the second stack means, the carriers 19–25 are in intermediate positions of the second stack means, the carrier 26 is moving transversely out of the lowermost station of the second stack means and the carrier 27 is in a station awaiting movement into the lowermost station of the first stack means.

The carrier 11, as shown in FIG. 1, is being moved to the left, receiving product from the left end of a loading conveyor 29, the carrier 11 being preferably moved at a speed approximately equal to the speed of movement of the product by the loading conveyor 29. The product, as illustrated, may be in the form of separate discrete items 30 such as, for example, packages of food to be frozen, but it will be understood that the invention is not limited to any particular form of product and, on the contrary, an important feature of the system is that it can readily handle various types of product without any modifications in construction.

While the carrier 11 is being moved to the left, the carrier 26 is moving to the right, the product items 30 supported thereon being engaged by a stationary back-up bar 31 to be dropped from the left-hand end of the carrier 26 on to an unloading conveyor 32, which moves the product to the left, preferably at approximately the same speed as the movement of the product on the loading conveyor 29.

When the carrier 11 is moved to a position such that it fully occupies the lowermost station of the first stack and is fully loaded with product, the carrier 18 will fully occupy the uppermost station of the second stack and the carrier 26 will have been moved fully out of the lowermost station of the second stack. At this point, a shuttle cycle is initiated in which each of the carriers 11-17 in the first stack is moved to a next higher station and each of the carriers 18-25 in the second stack is moved to a next lower station. At the same time, the carrier 27 is moved upwardly to a position in which the left-hand portion thereof is immediately under the left-hand end of the loading conveyor 29. This cycle of operation is completed within a relatively short interval of time and thereafter, the carrier 27 is moved to the left to receive product from the loading conveyor. At the same time, the carrier 17 is moved from the uppermost station of the first stack toward the uppermost station of the second stack and the carrier 25, now positioned in the lowermost station of the second stack, is moved to the right, product thereon being pushed therefrom onto the unloading conveyor 32 through the operation of the stationary back-up bar 31. As each carrier becomes fully loaded in the lowermost station of the first stack, the shuttle cycle is again repeated. Thus, each carrier is progressively moved upwardly through the first stack as indicated by arrow 33, thence transversely from the uppermost station of the first stack to the uppermost station of the second, as indicated by arrow 34, thence downwardly to the lowermost station of the second stack, as indicated by arrow 35, thence transversely as indicated by arrow 36, thence upwardly as indicated by arrow 37 and finally transversely back to the initial position. It is noted that all of the carriers with the exception of the carrier in the position of carrier 27 are active, being either fully loaded, being in the process of being loaded or being in the process of being unloaded.

FIGS. 2 and 3 diagrammatically illustrated fixed frame structure of the system and also vertically reciprocable frame structures of the upward and downward shuttles. A fixed frame structure, generally designated by reference numeral 34, includes a pair of spaced upright channels 35 and 36 at the left, another pair of spaced upright channels 37 and 38 at an intermediate position and a third pair of spaced upright channels 39 and 40 at the right. A pair of horizontal members 41 and 42 extend from the upper ends of the channels 35 and 36 to the upper edges of the channels 37 and 38 and another pair of horizontal members 43 and 44 extend from the upper ends of the channels 37 and 38 to the upper ends of channels 39 and 40 and therebeyond to terminal ends connected by a cross member 45. Another cross member 46 connects the upper ends of channels 35 and 36. Other cross members, not shown, are placed at lower levels to contribute to the rigidity of the fixed frame assembly.

An upward shuttle is provided which includes a vertically reciprocable frame structure 50 including lower and upper horizontal members 51 and 52 and upright end members 53 and 54, a set of members similar to the members 51-54 being provided on the rearward portion of the frame structure and being connected to members 51-54 through suitable cross members to form a generally rectangular frame. The lower frame member 51 is extended to the right and is connected to member 54 through an angle brace 55. Four front guides 50A and a similar set of four rear guides are mounted on the fixed frame structure to guide the frame structure 50 in its up and down movement.

A downward shuttle frame 56 is provided including lower and upper horizontal members 57 and 58 and upright end members 59 and 60, a set of members similar to the members 57-60 being provided on the rearward portion of the frame structure and being connected to members 57-60 through suitable cross members to form another generally rectangular frame structure. Four front guides 56A and a similar set of four rear guides are mounted on the fixed frame structure to guide the shuttle frame structure 56 in its up and down movement.

The upward shuttle frame 50 normally rests on two horizontal angles 61 and 62 respectively secured between the upright channels 37 and 38 and the upright channels 39 and 40. During the shuttle cycle, the frame 50 is moved upwardly to a position at which the member 52 is positioned as indicated in dotted lines in FIG. 3 and thence back to the position as illustrated in full lines. This movement is effected by means of four cables 63-66, cables 63 and 64 being connected to the left end of the frame 50 through suitable turnbuckles 67 and cables 65 and 66 being connected to the right end of the frame through turnbuckles 68, the turnbuckles 67 and 68 being adjustable for leveling purposes. Cables 63 and 64 make a 90° turn on a pair of sheaves 69 and 70 on a horizontal shaft 71, are guided over parts of a pair of double sheaves 73 and 74 on a horizontal shaft 75 and are connected to parts of another pair of double sheaves 77 and 78 on a horizontal shaft 80. Cables 65 and 66 make a 90° turn on the other parts of the double sheaves 73 and 74 and are connected to the other parts of the double sheaves 77 and 78. When shaft 80 is rotated through a predetermined angular distance, which may be on the order of 90°, the upward shuttle frame 50 is moved from the position illustrated in full lines to the position in which the frame member occupies the position indicated in dotted lines in FIG. 3.

The downward shuttle frame 56 normally occupies the position indicated in full lines in FIG. 3, but during the shuttle cycle is moved downwardly to a position in which the frame member 50 thereof occupies the position indicated in dotted lines in FIG. 3 and in which the frame 56 rests on two horizontal angles 81 and 82 respectively secured between upright channels 35 and 36 and upright channels 37 and 38. Such movement is controlled through four support cables 83-86, cables 83 and 84 being connected to the left side of the frame through turnbuckles 87 and cables 85 and 86 being connected to right portions of the frame 56 through turnbuckles 88. Cables 83 and 84 make a 90° turn on a pair of sheaves 89 and 90 on horizontal shafts 91 and 92, pass over parts of a pair of double sheaves 93 and 94 on a horizontal shaft 96 and are fixedly connected to parts of another pair of double sheaves 97 and 98 which are secured to the shaft 80. Cables 85 and 86 make a 90° turn on the other parts of the double sheaves 93 and 94 and are fixedly connected to the other parts of the double sheaves 97 and 98.

It is noted that the connections of the cables 63–66 for the upward shuttle frame 50 are to the upper sides of the sheaves 77 and 78 whereas the connections of the cables 83–86 are to the lower sides of the sheaves 97 and 98. Thus with clockwise rotation of the shaft 80, as viewed in FIG. 3, the upward shuttle frame 50 is moved upwardly while the downward shuttle frame 66 is moved downwardly. It is also noted that the sheaves 97 and 98 have a diameter substantially greater than that of the sheaves 77 and 78 so that the vertical movement of the downward shuttle 56 is substantially greater than that of the upward shuttle 50. This feature is important in securing proper operation of the shuttles as will be clarified hereinafter.

To actuate the shaft 80, an arm 100, rigidly secured thereto, is povitally connected to the end of a piston rod 101 of an air cylinder unit 102 which is pivotally carried between supports 103 and 104 carried from the fixed frame structure. When air is supplied to the cylinder 102 to actuate the rod 101 as hereinafter described, the rod 101 actuates the arm 100 through a predetermined angle, which may be on the order of 90° to actuate the frames 50 and 56 as above described. During this movement, the cylinder 102 may pivot slightly in a counterclockwise direction. Movement of the cylinder 102 in a clockwise direction is limited by a member 103, as diagrammatically illustrated in FIG. 3. It is noted that the weights of the shuttle frames 50 and 56 and the arrangement of the supports may preferably be such that the shuttle frames are urged to the positions as illustrated.

With regard to the upward shuttle operation, in general, each carrier is normally supported at four corner portions thereof by four station fingers supported from the stationary frame structures. When the upward shuttle frame 50 is moved upwardly, each carrier is lifted by four lifting fingers, carried by the frame 50, to a position above the station fingers for the next higher station, which are pivoted, about a vertical axis, out of the way. The station fingers are then pivoted back to the support position and the frame 50 is lowered, the lifting fingers being pivoted, about a vertical axis, to a position such as to clear the next lower carrier, the lifting fingers then being pivoted back to the initial position, to be ready to perform another lifting operation.

With regard to the downward shuttle operation, each carrier is normally supported at four corner portions by four lowering fingers carried by the downward shuttle frame 56. In the normal position, each carrier is positioned a short distance above four station fingers supported from the stationary frame structure. When the downward shuttle frame 56 is lowered, such station fingers are pivoted out of the way but as the carrier approaches the next lower position, the station fingers of the next lower station are pivoted into a supporting position to receive the carrier. The fingers supported by the frame 56 then move further downward, pivot, come up past and clear the carrier and then pivot back and lift the next higher carrier from the station fingers, completing the cycle.

These operations will be clarified hereinafter, but it is here noted that the fingers carried by the downward shuttle frame 56, although serving the primary function of lowering the carriers, also serve lifting functions during the shuttle cycle as well as support functions in the time intervals between shuttle cycles. For these reasons, such fingers carried by the vertically reciprocable frame 56 are referred to as "servicing" fingers. Similarly, the fingers carried by the upward shuttle frame 50, although primarily serving the function of lifting the carriers, also perform a lowering operation during part of the cycle and such fingers are also referred to as servicing fingers. Thus, servicing fingers are those carried from one or the other of the vertically reciprocable frames 50, 56 while "station" fingers are those supported from the stationary frame structure 34.

Before going into the details of the shuttle mechanisms it is believed that it will be helpful to understand the construction of the carriers in the illustrated system, the construction of the carrier 11 being shown in FIGS. 29, and 30, the other carriers 12–27 all having the same construction. Referring to FIGS. 29 and 30, the carrier 11 comprises four spaced parallel downwardly open channel members, including two end members 107 and 108 and two intermediate members 109 and 110, members 107–110 being welded or otherwise rigidly secured to and connected by two sets of angle members 111 and 112 spaced inwardly from the ends of the members 107–110, each set having one part extending between members 107 and 109, a second part extending between members 109 and 110 and a third part extending between members 108 and 110. Disposed between the angle members 111 and 112 are a plurality of spaced parallel bars 114 which are welded or otherwise secured to the members 107–110. The carrier 11 is thus in the form of an open grate structure, desirable for many types of product. It will be understood, however, that the carrier may provide an imperforate supporting surface, if required for a particular application.

As illustrated, the spacing between the end channel member 107 and the intermediate channel member 109 is greater than that between the opposite end channel member 108 and the adjacent intermediate channel member 110. This has a definite purpose which will be clarified hereinafter in connection with the transverse shuttle operations.

The sectional view of FIGS. 4A and 4B shows rearward members of the upward shuttle frame, including members 51A, 52A, 53A and 54A, respectively positioned behind the members 51, 52, 53 and 54 shown in the front view of FIG. 3. Similarly, FIG. 4A shows members 57A, 58A, 59A and 60A of the downward shuttle frame 56, respectively positioned behind the members 57, 58, 59 and 60 shown in the front view of FIG. 3.

The upward shuttle mechanism comprises four servicing finger assemblies, a left-hand rearward assembly being shown in FIG. 4. This assembly includes servicing fingers 115–121 projecting transversely from a vertical rod 122 which is supported from the left-hand rearward vertical frame member 53A for pivotal movement about a vertical axis, the support of the rod 122 being illustrated in FIGS. 15–17, described hereinafter.

The upward shuttle mechanism further includes four station finger assemblies. The left-hand rearward station finger assembly, shown in FIG. 4A, comprises station fingers 123–128 projecting transversely from a vertical rod 130 which is supported from the channel member 38 of the stationary frame for pivotal movement about a vertical axis, in a manner as shown in FIGS. 18–20, described hereinafter.

The upward shuttle mechanism further includes left-hand front servicing and station finger assemblies, right-hand front servicing and station finger assemblies and right-hand rear servicing and station finger assemblies, the latter being shown in FIG. 4B and including servicing fingers 131–137 on a rod 138 and station fingers 139–144 on a rod 146.

In the operation of the upward shuttle mechanism as thus far described, the carriers 12–17 are normally supported on the station fingers 123–128 of the left-hand rear assembly, the station fingers 139–144 of the right-hand rear assembly and similar station fingers of the left and right hand front station finger assemblies. The carrier 11 is supported for horizontal slidable movement by a rearward stationary angle member 148 and a similar front stationary angle member and is moved to the left by a chain assembly as hereinafter described. When the carrier 11 is moved to the left to fully occupy the lowermost station of the first or right-hand stack, the channel member 107 thereof overlies the servicing finger 115 while the channel member 108 thereof overlies the servicing finger 131 and as shown in FIGS. 4A and 4B, similar channel members of the carriers 12–17 overlie the servicing fingers 116–121, the servicing fingers 132–137 and similar servicing fingers of the left and right-hand front servicing finger assemblies. When the upward shuttle frame 50 is then moved upwardly, the servicing fingers engage and lift the carriers 11–17. During the initial portion of such lifting movement, the vertical rods 130 and 148 are pivoted about their vertical axes to move the station fingers 123–128 and 139–144 out of the way to allow each carrier to be lifted to a position above the station finger for the next higher station. The station fingers are then pivoted back to the initial position whereupon the upward shuttle frame 50 is moved back downwardly to the initial position to allow the carriers to rest upon the station fingers.

During the upward shuttle operation, the uppermost carrier 17 is lifted to a position in which it can be moved to the left to the uppermost position of the other stack. During such movement, the rearward ends of the intermediate channels of the carrier 17, corresponding the intermediate channels 109 and 110 of the carrier 11 as shown in FIGS. 29 and 30, engage a pair of short angle members 149 and 150 which, as hereinafter described, are pivotal about horizontal axes and are spring urged to the illustrated positions. When the carrier 17 is moved to a position substantially above the members 149 and 150, they snap back to the illustrated position so that when the carrier 17 is lowered, the rearward ends of the intermediate channels thereof rest on the members 149 and 150. A similar pair of members are provided for supporting the front ends of the intermediate channels. Additional stationary rearward angle members 151, 152 and 153 and similar front angle members are provided for supporting the carrier for horizontal slidable movement to the uppermost position of the other stack.

The carrier 18 is shown in a position in which it is moving to the left toward a position fully occupying the uppermost station of the second stack. In this position, the rearward ends of the channels of the carrier 18 rest upon horizontal leg portions of a stationary angle member 155, which has openings 156 and 157 in the horizontal leg thereof through which the rear ends of the intermediate channels of the carrier can move downwardly when the carrier reaches a position fully to the left. The spacing of opening 156 from the left end of member 155 is greater than the spacing of opening 157 from the right end, corresponding to the location of the intermediate channel members of the carriers in non-symmetrical relation. A similar angle member with similar openings is provided at the front.

To move the carrier 18 to the left, a finger 150 is carried by a chain 160, entrained on suitable sprockets 161 and 162, the finger 150 being engaged with the left-hand end channel of the carrier 18. Finger 159 moves the carrier 18 to the left until the left end of the carrier engages a fixed stop 163 which is spaced from the left end of angle member 155 by a distance greater than the width of the left end channel member of the carrier. At this point the intermediate channel members are aligned with the openings 156 and 157 and the right end channel member is aligned with a space between the right end of angle member 155 and the left end of member 155, allowing the carrier to drop onto the downward shuttle. The support and operation of the finger 159 is illustrated and described in detail in connection with FIGS. 31 and 32.

The downward shuttle mechanism is similar to the upward shuttle mechanism in that it comprises four servicing finger assemblies and four station finger assemblies, the left and right-hand assemblies being shown in FIG. 4A. The left-hand rear servicing finger assembly comprises fingers 165–170 projecting transversely from a vertical rod 172 while the left-hand rear station finger assembly comprises fingers 173–177 projecting transversely from a vertical support rod 178. The servicing finger rod 172 is supported from the downward shuttle frame 56 while the station finger support rod 178 is supported from the stationary frame of the system. Similarly, a right-hand rear servicing finger assembly is provided comprising fingers 181–186 projecting transversely from a vertical rod 188 and a station finger assembly is provided comprising fingers 189–193 projecting transversely from a vertical rod 194. Similar left and right-hand front servicing and station finger assemblies are provided.

It is here noted that the rods 172, 178, 188 and 194, as well as other vertically extending members in the system are shown with intermediate portions broken away to facilitate illustration and also to indicate that as many stations may be provided in each stack as may be desirable in a particular application of the system. Thus, in FIG. 4A, carriers 22 and 23 referred to in connection with the illustration of FIG. 1, are not shown and the corresponding servicing and station fingers are also not shown.

As shown in FIG. 4A, the rear ends of the opposite end channel members of the carriers 19, 20, 21, 24 and 25 rest on the servicing fingers 166–170 and 182–186 and when the carrier 18 is moved fully to the left, to a position such that the rear ends of the intermediate channels thereof are aligned with the openings 156 and 157, the rear ends of the end channels thereof will rest on the servicing fingers 165 and 181. When the downward shuttle frame 56 is moved downwardly, the station fingers 173–177 and 189–193, as well as similar station fingers of the front assemblies are pivoted out of the way to permit the respective carriers to pass to a lower position after which the station fingers are returned to the initial position. Thus, station finger 173, for example, is pivoted out of the way, to permit the carrier 19 to move downwardly therebelow whereupon the station fingers are pivoted back so that the carrier 18 will rest temporarily on the station finger 173, carrier 19 will rest temporarily on the station finger 174, etc. In this connection, the downward shuttle frame 56 is moved downwardly through a vertical distance substantially greater than twice the nominal vertical distance between stations. By way of example, and not by way of limitation, the vertical distance between stations may be 4 inches while the distance of movement of the downward shuttle frame may be 9 inches.

After depositing the carriers on the station fingers temporarily, the servicing fingers continue their downward movement without pivoting, until the limit of downward travel is reached. Then, in upward travel, the servicing fingers are pivoted to clear the carrier and are then pivoted back to pick up the next higher carrier and lift it from the station fingers. For example, the finger 165 will lower the carrier 18 until it rests temporarily on the station finger 173, then moves further downwardly, then moves upwardly while pivoting to clear the carrier 18 and move back upwardly to the illustrated position in readiness to receive the next carrier 17. The servicing finger 166 moves downwardly to move the carrier 19 downwardly past the station finger 173, then deposits the carrier 19 on the station finger 174, then moves further downwardly and then upwardly while pivoting to clear the carrier 19 and then back to pick up the carrier 18, then deposited temporarily on the station finger 173 and finally to the position as illustrated, in which it will then support the carrier 18, rather than the carrier 19. The lowermost servicing finger 170 will move the carrier 25 downwardly past the station finger 177, then pivoted out of the way, and further downwardly until the carrier rests on a rearward stationary angle member 196 and a similar front angle member. The servicing finger 170 moves further downwardly, then upwardly while pivoting to clear the carrier 25 and then back to pick up the carrier 24, then deposited on the station finger 177 and to then move the carrier 24 to the position in which carrier 25 is illustrated.

In the illustrated system, the vertical support rods for the servicing and station fingers both the upward and downward shuttles are actuated from movement of the shuttle frames through pilot finger and cam assemblies illustrated in FIGs. 7–14 and 21–28, described in detail hereinafter.

The carrier 26 is shown in the process of being moved to the right in FIGS. 4A and 4B. This movement is effected by a transverse shuttle mechanism which includes a finger 197 carried by one link of a chain 198 entrained about a pair of sprockets 199 and 200. During such movement of the carrier 26, product is removed therefrom by operation of the back-up bar 31 to be deposited on the unloading conveyor which includes a belt 202 entrained rollers including a roller 203, the upper portion of the belt 202 being slightly below the support rail or angle 196 and the corresponding rail or angle at the front. When the carrier 26 reaches a position such as to be completely out of the lowermost station of the downward shuttle stack and such that the right end thereof is adjacent the left end of the carrier 26, the carrier 27 is lifted from a stationary support rail or angle 205 at the rear of the system, aligned with the angle 196, and a correspondingly rail or angle at the front. Lifting of the carrier 27 is effected by means of a pair of fingers 207 and 208 which are supported through upright supports 209 and 210 from the extension of the lower rear horizontal frame member 51a of the upright shuttle, a similar pair of fingers being supported from the extended portion of the front frame member 51. After the shuttle cycle is completed, and after the fingers 208 and 207 and corresponding front fingers are lowered, the carrier 26 is moved to the right to the position in which carrier 27 is shown in FIG. 4B.

When the carrier 27 is lifted, the rearward ends of the intermediate channels thereof engage a pair of short angle sections 211 and 212, which are pivoted about horizontal axes and which are spring urged to the illustrated position. After the carrier 27 is lifted to a predetermined extent, the sections 211 and 212 snap back to the illustrated position to receive the rear ends of the intermediate channels of the carrier 27 when the upright shuttle frame 50 is lowered. Angle sections similar to the sections 211 and 212 are provided for operative association with the front ends of the intermediate carrier channels.

After the carrier 27 is lifted to rest on the sections 211 and 212, the left-hand one of the intermediate channels thereof is engaged by a finger 213 of an auxiliary shuttle, finger 213 being supported on a link of a chain 214 entrained on a pair of sprockets 215 and 216. The carrier is moved a short distance to the left by the finger 214, being supported by rearward angle sections 217, 218, 219 and 220 aligned with the angle sections 211 and 212, similar front angle sections being also provided. After being moved a short distance to the left by the finger 213 of the auxiliary shuttle, the left-end channel of the carrier is engaged by a finger 222 carried by a link of a chain 223 which is entrained on sprockets 224 and 225. As shown in FIG. 4A, the finger 222 is engaged with the channel 107 of the carrier 11, in the process of moving the carrier 11 to the left.

It is noted that when the carrier 27 is being moved upwardly, the left-hand end portion thereof is to the left of the end of the loading conveyor 29 which comprises a suitable belt 227 entrained on guide rollers including the roller 228. An angle plate 229 may be provided to direct the product angularly downwardly on to the receiving carrier.

The sectional view of FIGS. 4A and 4B show only the components and the rearward portion of the apparatus and some of the corresponding frontward components are shown in the sectional views of FIGS. 5A and 5B and FIGS. 6A and 6B. With reference thereto, the left-hand front upward shuttle assembly includes vertical support rods 233 and 234, respectively corrresponding to vertical support rods 122 and 130 and having servicing and station fingers projecting therefrom. The right-hand front upward shuttle assembly includes vertical support rods 235 and 236 for servicing and station fingers.

For cooperation with the rail or angle member 148 in supporting a carrier for sliding movement into the lowermost station of the upward shuttle stack, a second rail or angle member 238 is provided, engagable by the front ends of the channels of the carrier supported thereby.

The left-hand front assembly of the downward shuttle includes vertical support rods 239 and 240 for servicing and station fingers while the right-hand front assembly of the downward shuttle includes vertical support rods 241 and 242 for servicing and station fingers.

A front rail or angle member 244 is provided for engagement by the front ends of the carrier channel members and for cooperation with the angle member 196 in supporting a carrier during movement out of the lowermost station of the downward shuttle stack.

As shown in FIG. 6A, a finger 245 is preferably provided, aligned with the finger 197 and cooperating therewith in moving the carriers from the lowermost station of the downward shuttle stack to the position in which carrier 27 is illustrated. The finger 245 is supported on a link of a chain 246 entrained about sprockets 247 and 248 aligned with the sprockets 199 and 200. Preferably, the sprockets 199 and 247 are on a common shaft 250 to be driven in synchronism.

Preferably, the chains 198 and 246 carry an additional pair of fingers 251 and 252 at positions on the chains spaced from the fingers 197 and 245 by a distance equal to one-half the length of the chains. When fingers 197 and 245 have moved a carrier to the position in which carrier 27 is illustrated and then pass downwardly around the end sprockets 200 and 248, the fingers 251 and 252 will come up around the sprockets 199 and 247 to pick up the carrier in the lowermost position of the downward shuttle stack.

As shown in FIG. 6B, a front rail or angle member 254 is provided for engagement by the front ends of carrier channels and for cooperation with the angle member 205. As also shown, a pair of lift fingers 255 and 256 are provided for engaging the front ends of end carrier channels, cooperating with the fingers 207 and 208.

As shown in FIG. 5B, front pivotal angle sections 257 and 258 are provided at the front, cooperating with the angle sections 211 and 212. As also shown, the auxiliary shuttle preferably includes a second finger 261 cooperating with the finger 213 and supported by on a link of a chain 262 entrained on sprockets 263 and 264, aligned with the sprockets 215 and 216. Preferably, the sprockets 216 and 264 are on a common shaft 265 which carries a pinion 266 meshed with a vertical rack 267, the rack 267 being supported by an angle 268 rigidly secured to the frame member 51 of the upward shuttle frame, 50, as shown in FIG. 3. When the frame 50 is in a fully lowered position, the finger 213 will be to the left as shown in FIG. 4B, the finger 261 being aligned therewith. When the upward shuttle frame 50 is moved upwardly, the chains 214 and 262 are driven to move the fingers 213 and 261 to the right, the fingers being so supported as to allow them to pass over the channel member of a carrier, supported on the pivotal angle sections 211 and 257. Then when the upright shuttle frame 50 moves downwardly, the fingers 213 and 261 are moved to the left to the position as illustrated, moving the carrier into a position in which the left-hand end portion thereof can start receiving product.

Front angle sections 269, 270, 271 and 272 are provided, respectively corresponding to the angle sections 217, 218, 219 and 220 and cooperating therewith in supporting a carrier during movement by the auxiliary shuttle.

When the auxiliary shuttle completes its operation, the left-hand channel of the carrier moved thereby is engaged by the finger 222 and preferably also by a finger 274 aligned with the finger 222 and a carrier on a link of a chain 275 entrained on sprockets 276 and 277. Preferably, the sprockets 224 and 276 may be on a common shaft 279 while sprockets 225 and 277 may be on a common shaft 280.

With reference to FIG. 6A it is noted that for guiding the product on the unloading conveyor belt 202, guide means are provided including a first pair of front and rear guide plates 281 and 282, a second pair of front and rear plates 283 and 284 and a third pair of front and rear guide plates 285 and 286, the left and right ends of the guide plates 283 and 284 being spaced from the right ends of the guide plates 281 and 282 and the left ends of the guide plates 285 and 286 for clearing intermediate channels of a carrier. Preferably, the right ends of the guide plates 285 and 286 may be integrally attached to the opposite ends of the back-up bar 31, as illustrated.

FIGS. 7–10 show the left-hand rearward servicing and station finger assemblies of the upward shuttle mechanism and the actuation thereof. The servicing finger support rod 122 is supported from the upright member 53A at the rear of the upward shuttle frame 50 for pivotal movement about a vertical axis and is spring-urged in a clockwise direction as viewed in FIGS. 9 and 10, to position the servicing fingers 115–121 as illustrated, only the fingers 117–121 being shown in FIGS. 7 and 8. The rod 122 carries at its upper end a pilot finger 290 which, during upward movement of the upward shuttle frame 50, engages one surface 291 of a cam 292 to deflect the cam 292 to the position as shown in dotted lines in FIG. 7. After the pilot finger 290 is elevated beyond the upper rnd of the cam 292, the cam 292 moves back to the position illustrated in full lines in FIG. 7. Then, during downward movement of the upward shuttle frame 50, the pilot finger 290 engages in opposite surface 293 of the cam 292 and the pilot finger 290 is rotated in a counter-clockwise direction, as viewed in FIG. 9, to rotate the rod 122 about its vertical axis and to rotate all of the servicing fingers 115–121 to positions as indicated in dotted lines in FIG. 10, in which the servicing fingers clear the left-hand channel members of the respective carriers.

The station finger support rod 130 is spring-urged to a position in which the station fingers 123–128 are positioned as shown in full lines but is pivotal about a vertical axis in a counter-clockwise direction as viewed in FIGS. 9 and 10, to position the station finger 128 and the other station fingers as indicated in dotted lines in FIG. 10. For actuation of the station finger support rod 130, it carries, at an intermediate point, a pilot finger 296 which is engagable by one surface 297 of a cam 298 carried from the left-hand rear upright frame member 53A of the upward shuttle frame 50. When the pilot finger 296 is engaged by the surface 297 of the upwardly moving cam 298, the finger 296 is pivoted in a counter-clockwise direction to a position as shown in dotted lines in FIG. 10. The shaft 130 is thereby rotated and the station finger 128, as well as the other station fingers therebelow, are rotated to positions as indicated in dotted lines in FIG. 9, permitting the ends of the carriers to clear the station fingers during upward movement of the upward shuttle frame 50. During a final portion of the upward movement, the lower end of the cam 298 goes above the pilot finger 296, permitting the pilot finger 296 to spring back to the position as illustrated in full lines in FIG. 10 and positioning the station fingers as indicated in full lines, so that in the initial portion of the downward movement of the frame 50, the elevated carriers are lowered to rest on the station fingers. With further downward movement of the frame 50, an opposite surface 299 of the cam 298 engages the pilot finger 296, and the cam 298 is pivoted to a position as indicated in dotted lines in FIG. 7, until the upper end of the cam 298 is below the pilot finger 296, whereupon the cam 298 moves back to the position as indicated in full lines.

FIGS. 11-14 show the left-hand rearward servicing and station finger assemblies of the downward shuttle mechanism and the actuation thereof. The servicing finger carrying shaft 172 is spring-urged in a clockwise direction, as viewed in FIGS. 13 and 14 to position the servicing fingers shown in full lines, but is pivotal in a counter clockwise direction to move the servicing fingers to positions in which they clear the rearward ends of the left-hand channels of the respective carriers. For actuation of the servicing finger support rod 172, it carries at its upper end a pilot finger 301 which during downward movement of the downward shuttle frame 56 engages a surface 302 of a cam 303 to pivot the cam 303 to a position as shown in dotted lines in FIG. 11. When the pilot finger 301 moves below the lower end of the cam 303, the cam 303 is moved back, by spring action, to the position as indicated in full lines. During the initial portion of an upward movement of the downward shuttle frame 56, the pilot finger 301 engages an opposite surface 304 of the cam 303 and the pilot finger 301 is pivoted to a position as shown in dotted lines in FIG. 13, thereby positioning all of the servicing fingers in correspondingly positions such that they clear the rearward end portions of the left-hand channels of the respective carriers. When the pilot finger 301 is moved upwardly beyond the upper end of the cam 303, the pilot finger 301 and all of the servicing fingers are pivoted back to the initial positions, by spring means acting on the rod 172.

The station fingers carried by the rod 178 are normally positioned as shown in full lines but the rod 178 is pivotal in a counter clockwise direction, as viewed in FIGS. 13 and 14, against the force of spring means acting thereon, to so position the station fingers as to allow the respective carriers to pass thereby. To actuate the station finger support rod 178, it carries, at an intermediate point, a pilot finger 306. During downward movement of the downward shuttle frame 56, the pilot finger 306 is engaged by a surface 307 of a cam 308, carried from the downward shuttle frame 56, to pivot the pilot finger 306 to a position as indicated in dotted lines in FIG. 14, thereby pivoting the rod 178 and the station fingers carried thereby to positions as indicated in dotted lines in FIG. 13, so that the respective carriers can move downwardly therebelow. When the upper end of the cam 308 moves below the pilot finger 306, the pilot finger 306 is moved back to the full line position of FIG. 14, thereby moving all of the station fingers to the initial position. During upward movement of the downward shuttle frame 56, an opposite surface 309 of the cam 308 engages the pilot finger 306 to pivot the cam 308 to a position as shown in dotted lines in FIG. 11, until the lower end of the cam 308 is above the pilot finger 306, whereupon the cam 308 is moved back to the full line position.

FIGS. 15-17 show the support of the servicing finger support rod 122 from the left-hand rear upright frame member 53A of the upward shuttle frame 50. It is noted at the outset that the servicing fingers 115-121 are shown in FIGS. 15 and 16 and additional fingers are shown between the fingers 117 and 118, to show that additional fingers may be provided for additional stations if additional temporary storage capacity is desired in the system.

As shown in FIGS. 15 and 16, the rod 122 is journalled for rotation about its vertical axis by means of four eye-bolts secured to one leg of the angle member 53A. A coiled torsion spring is disposed on the rod 122 between the pilot finger 290 and the upper servicing finger 121, the upper end of the spring 315 being secured to the rod 122 and the lower end thereof being secured to the member 53A. The spring 315 urges the rod 122 in a clockwise direction, as viewed in FIG. 17, to engage the pilot finger 290 with a stop member 316 carried by the member 53A. Additional stop members 317 and 318 are secured to the member 53A, engagable by the lower and upper ends of the rod 122 to prevent vertical movement thereof.

FIGS. 18, 19 and 20 show the support of the station finger support rod 130 of the left-hand rearward station finger assembly of the upward shuttle mechanism. In FIGS. 18 and 19, additional station fingers are shown between the station fingers 124 and 125 to indicate that additional stations may be provided, according to requirements.

The rod 130 is journalled by three eye-bolts 320, 321 and 322 which are secured to an upright channel member 324, forming part of the stationary frame of the apparatus and disposed in spaced relation in front of the rearward upright channel member 38, as shown in FIG. 5A. A coiled torsion spring 325 is disposed on the rod 130 between the eye-bolt 320 and the station finger 128, the upper end of the spring 325 being securely fastened to the rod 130 and the lower end thereof being securely fastened to the channel member 324. The rod 130 is urged by the spring 325 in a clockwise direction, as viewed in FIG. 20, to engage the upper station finger 128 with a stop member 326 carried by the channel member 324. A pair of stop members 327 and 328, carried by the channel member 324, engage the lower and upper ends of the rod 130 to prevent vertical displacement thereof.

FIGS. 21 and 22 illustrate the support of the cam 292, the lower end of which is rigidly secured to a pin 330 which extends through a sleeve 331 welded or otherwise secured to a support plate 332 and through an aligned opening of the plate 332, a suitable fastening means 333 being provided on the end of the pin 330 to prevent removal while permitting free rotation of the cam 292. The plate 332 is welded or otherwise secured to a support plate 335 which is bolted to a horizontal angle member 336, angle member 336 being disposed between and welded or otherwise secured to the upright channel members 38 and 324, as shown in FIG. 9. A coiled tension spring 337 is hooked at one end to an eye-bolt 338, secured to support member 335 and the angle member 336 and is hooked at the other end thereof to an eye-bolt 339 which is secured to a plate 340 welded or otherwise secured to the cam 292. A stop member 341 is welded or otherwise secured to the plate 332 in position to engage and limit counter-clockwise movement of the cam 292.

FIGS. 23 and 24 illustrate the support of the cam 298. The lower end of the cam 298 is welded or otherwise secured to one end of a horizontal pin 343 which extends through a sleeve 344, welded or otherwise secured to a support plate 345, a suitable fastening means 346 being provided on the end of the pin 343 to prevent removal while permitting free rotation of the cam 298. The plate 345 is welded or otherwise secured to a base plate 347 which is bolted to the left-hand rearward upright angle member 53A of the upward shuttle frame 50. A coiled tension spring 349 is hooked at one end to an eye-bolt 350 which is secured to a plate 351 welded or otherwise secured to the rearward side of the frame member 53A and the other end of the spring 349 is hooked to an eye-bolt 352 which is secured to the rearward end of a horizontal bar 353 the forward end of which is welded or otherwise rigidly secured to the cam 298. The spring 349 urges the cam 298 in a clockwise direction, as viewed in FIG. 23, clockwise rotation being limited by engagement of the cam 298 with a stop bar 354 which is welded or otherwise secured at its rearward end to the plate 345.

FIGS. 25 and 26 show the support of the cam 303 which functions to operate the pilot finger 301 for the servicing finger carrying rod 172 of the left-hand rearward assembly of the downward shuttle mechanism. Cam 303 is welded or otherwise rigidly secured at its upper end to one end of a pin 356 which extends through a sleeve 357, welded or otherwise secured to a plate 358, and through an aligned opening of the plate 358, a suitable fastening means 359 being provided on the end of a pin 356. The plate 358 is welded or otherwise secured to a base plate 360 which is bolted to an angle member 362. Angle member 362 extends horizontally between the upright channel member 36 and an upright angle member 364 disposed in spaced relation in front of the channel member 36 and forming part of the stationary frame of the apparatus, the angle member 364 being shown in FIG. 5A and also in FIGS. 13 and 14.

A coiled tension spring 365 is hooked at one end to an eye-bolt 366 which is secured to a member 367 welded or otherwise secured to the plate 358 and is hooked at the other end to an eye-bolt 368 which is secured to a member 369 welded or otherwise secured to the cam 303. The spring 365 urges the cam 303 in a clockwise direction, as viewed in FIG. 25, clockwise rotation of the cam 303 by being limited by engagement with a stop bar 370 which is welded or otherwise secured to the plate 358.

FIGS. 27 and 28 show the support of the cam 308 which actuates the pilot finger 306 for the station fingers at the left-hand rearward assembly of the downward shuttle mechanism. Cam 308 is welded or otherwise secured at its upper end to one end of a pin 372 which extends through a sleeve 373, secured to a plate 374, a suitable fastening means 375 being provided on the end of the pin 372. The plate 374 is secured to a base plate 376 which is bolted to the upright angle member 59A at the left-hand rearward corner of the downward shuttle frame 56. A coiled tension spring 377 is hooked at one end to an eye-bolt 378 which is secured to a member 379 secured to the angle member 59A and is hooked at the other end to an eye-bolt 381 which is secured to the rearward end of a horizontal bar 382, the forward end of the bar 382 being welded or otherwise secured to the lower end of the cam 308. The spring 377 urges the cam 308 in a counter-clockwise direction, movement in that direction being limited by a stop member 384 secured at its rearward end to the plate 374 and having its forward end in the path of the cam 308.

FIGS. 31 and 32 illustrate a small section of the chain 160 and the support of the finger 159 thereon, in the upper transverse shuttle mechanism. The chain 160 is a conventional roller type sprocket chain, including rollers 387–390 on pins 391–394, three pairs of links 395, 396 and 397 being illustrated which link pins 391 and 392, pins 392 and 393, and pins 393 and 394. The pin 392 is elongated and extends through a plate 398 and also through the finger 159, a suitable fastening means 399 being provided on the end of the pin 392 and washers 401 and 402 being provided between the plate 398 and the adjacent link 395 and between the plate 398 and the finger 159. The lower end of the finger 159 is engagable with an end channel member of a carrier in the uppermost position. The upper end thereof carries a plate 403 to which an eye-bolt 404 is secured. A coiled tension spring 405 is hooked at one end to the eye-bolt 404 and at its opposite end to an eye-bolt 406 which is secured to a plate 407 welded or otherwise secured to the plate 398. The spring 405 urges the finger 159 in a clockwise direction, as viewed in FIG. 32, movement of the finger 159 in the clockwise direction being limited by engagement thereof with a stop member 408 secured to the plate 398. When the carrier is stopped, the finger 159 can pivot in a counter-clockwise direction, to a position as illustrated in dotted lines in FIG. 32, allowing the finger 159 to pass over a channel member of a carrier.

The finger support arrangement shown in FIGS. 31 and 32 may be used for all of the chain-supported actuating fingers of the apparatus. The spring in each case must supply sufficient force for overcoming the friction normally encountered by the carriers and to insure proper movements thereof.

FIGS. 33–35 illustrate the support and operation of one of the deflectable angle sections used in the apparatus to operate as a one-way gate, permitting upward movement of a carrier to a certain position while preventing downward movement of the carrier from that position. The angle section illustrated in FIGS. 33–35 is the section 258, shown in the lower right in FIG. 5B. A similar construction may be used for each of the other angle sections, including angle sections 149 and 150 at the upper rear portion of the upward shuttle stack assembly, the corresponding upper front angle sections, the sections 211 and 212 and the section 257.

A pair of members 411 and 412 are welded or otherwise rigidly secured to the outer side of the angle section 257, adjacent the opposite ends thereof and have aligned openings through which a horizontal shaft 414 extends, the shaft 414 being supported by a pair of members 415 and 416 which are welded or otherwise secured to the adjacent ends of the fixed angle sections 271 and 272. A coiled torsion spring 418 is disposed on the shaft 414 and has one end 419 welded or otherwise affixed to the shaft 414 and another opposite end 420 extending upwardly against the outer surface of the angle member 258. The spring 418 urges the angle section 258 in a clockwise direction, as viewed in FIG. 35, to normally position the angle section 258 against a pair of stop bars 421 and 422 which are welded or otherwise secured to the undersides of the sections 271 and 272 and which project under the angle section 258. When engaged by the end of a channel member above an upwardly moving carrier, the angle section 258 is pivotal to a position as indicated in dotted lines in FIG. 35. After the carrier is moved further upwardly, the angle section 258 is snapped back by the spring 418 to the position as illustrated in full lines so that when the carrier is lowered, it will be supported by the angle section 258.

FIGS. 36–40 show schematically the drive of the sprockets for the transverse shuttle chains. A sprocket 424 on the shaft 280 may be driven through a chain 425 from a sprocket 426 on a support shaft 427 for the roller 228 of the loading conveyor 29. Shaft 427 may be driven by a conventional conveyor drive mechanism, or from the belt 227, moved by drive of another roller. Shaft 280 drives the sprockets 225 and 277 and thereby the chains 223 and 275, the sprockets 224 and 276 and shaft 279, and also the feed fingers 222 and 274. As shown in FIG. 40, a gear 429 on shaft 279 drives a gear 430 on a counter shaft 431 which carries a pair of sprockets 433 and 434. Sprocket 433 is coupled through a chain 435 to a sprocket 436 on the shaft 250 which drives the sprockets 199 and 247 and thereby the chains 198 and 246, sprockets 200 and 248 and fingers 197, 245 251 and 252. It is noted that the unloading conveyor belt 202 may be independently driven or may, if desired, may be driven from the loading conveyor drive, directly or indirectly.

Sprocket 434 on the counter-shaft 431 drives a chain 437 which drives a sprocket 438 on a shaft 439 which carries the sprocket 162, driving the chain 160, sprocket 161 and finger 159. As shown in FIG. 39, shaft 439 may preferably carry a second sprocket 440 driving a chain 441 entrained on a sprocket 442 aligned with the sprocket 161. Chain 441 may carry a finger 443 alinged with the finger 159. Thus, fingers 159 and 443 may respectively engage front and rear portions of an end channel of a carrier to move the carrier to the uppermost station of the downward shuttle stack.

It is noted that the drive of the auxiliary shuttle fingers 213 and 261 is effected from movement of the upward shuttle frame 51, independently of the drive of the other transverse shuttles, as above indicated. Upon movement of the frame 50 upwardly, the rack 267 on the support 268 is moved upwardly to drive the pinion 266 in a counter-clockwise direction and to thereby drive the sprockets 215, 216, 263 and 264 in a counter-clockwise direction, moving the fingers 213 and 261 to the right. When the upward shuttle frame 50 is moved downwardly, the rotation is reversed, the fingers 213 and 261 being moved back to the initial position. This movement is effected quite rapidly, to rapidly move a carrier in a position to start receiving product from the end of the loading conveyor.

FIG. 41 shows schematically an arrangement for controlling the air cylinder 102 which effects the upward movement of the upward shuttle frame 50 and the downward movement of the downward shuttle frame 56 in the manner as above described. Cylinder 102 is connected through a four-way valve 444 to a compressed air supply line 445 and an exhaust line 446. Valve 444 is operated by a solenoid 447 one terminal of which is connected to a supply line terminal 448 and the other terminal of which is connected through a contact 449 of a relay 450 to a circuit point 451 which is connected through an on-off switch 452 to a second supply line terminal 453. The relay has a holding contact 454 which is connected in series with a microswitch 455 between circuit point 451 and one terminal of the relay 450, the other terminal of the relay 450 being connected to the supply line terminal 448. Microswitch 455 is mechanically coupled to the piston 101 of the air cylinder 102 to be opened, at the limit of travel of the piston 101. Another microswitch 456 is provided which is electrically connected in parallel with the holding contact 454 and which is physically positioned to be closed by a carrier fully moved into the lowermost station of the upward shuttle stack. For example, the microswitch 456 may be associated with a stop 458 (FIG. 4A) which is engagable by the left end of a carrier moving on the support angles 148 and 238.

Normally, with solenoid 447 deenergized, compressed air is supplied from line 445 through valve 444 to the left side of cylinder 102, the right side being connected through the valve 444 to the exhaust line 446. When the on-off switch 452 is closed and when the microswitch 456 is closed by a carrier moving into the lowermost station of the upward shuttle stack, the relay 450 is energized, closing the contact 449 to energize the solenoid 447 and to actuate the valve 446 to a position in which compressed air flows from line 445 to the right side of cylinder 102, the left side being coupled to the exhaust line 446, thus causing movement of piston rod 101 to the left. At the same time, the holding contact 454 is closed to maintain the relay 450 in an energized condition until the piston rod 101 is moved to the limit of its travel to the left, whereupon the contact 455 is opened, deenergized the relay 450 and thereby the solenoid 447 and permitting the piston rod 101 to move back, with the shuttle frames being returned to the initial positions. Another cycle is initiated when the microswitch 456 is again closed by a carrier moving fully into the lowermost station of the upward shuttle stack.

As has been previously indicated, the two stacks may have any desired number of stations, according to the requirements of the processing or storage application in which the system is used. In the illustrated system, there is only one loading and one unloading conveyor but by using carriers of appropriate width, the system can receive product from two or move loading conveyors in side-by-side relation and deliver product to two or more unloading conveyors in side-by-side relation. It will be appreciated that other modifications and variations may be effected without departing from the spirit and scope of the novel concepts of this invention.

I claim as my invention:

1. In a product conveying system, first and second stack means in adjacent relation each arranged for supporting a plurality of separate product carriers, each of said stack means defining a plurality of vertically aligned product carrier stations including lowermost and upper-most stations and a plurality of intermediate stations, upward shuttle means associated with said first stack means for simultaneously shifting each carrier therein upwardly to the next higher station, upper transverse shuttle means for shifting a carrier from the uppermost station of said first stack means to the uppermost station of said second stack means, downward shuttle means associated with said second stack means for simultaneously shifting each carrier thereof downwardly to the next lower station, lower transverse shuttle means for shifting a carrier from the lowermost station of said second stack means to the lowermost station of said first stack means, loading conveyor means for supplying a product to a carrier in one station of said first stack means at a certain linear speed, and receiving means for effecting receiving movement of the product onto the surface of a carrier in said one station at said certain linear speed, said receiving means being effective to move a carrier from a position under said loading conveyor means and into said one station at said certain linear speed.

2. In a system as defined in claim 1, loading conveyor means for supplying a product to a carrier in one station of said first stack means, and unloading conveyor means for receiving a product from a carrier in one station of said second stack means.

3. In a system as defined in claim 2, said one station of said first stack means, said one station of said first stack means and said one station of said second stack means being in generally horizontal alignment.

4. In a system as defined in claim 2, said one station of said first stack means being the lowermost station thereof, and said one station of said second stack means being the lowermost station thereof.

5. In a system as defined in claim 2, said input and output conveyors being operable to move the product horizontally at approximately the same speed.

6. In a system as defined in claim 5, said upward, downward and first and second transverse shuttle means being operable periodically with the time period between operations being approximately equal to the dimensions of each carrier in a direction parallel to the direction of movement of said conveyor means divided by the speed of movement of said conveyor means.

7. In a system as defined in claim 1, wherein said one station of said first stack means is the lowermost station thereof, said second transverse shuttle means including means for moving a carrier from the lowermost station of said second stack means to said position under said loading conveyor, said receiving means being thereafter effective to move said carrier into said lowermost station of said first stack means.

8. In a system as defined in claim 1, each of said carriers defining support means in a horizontal plane for underlying and supporting the product.

9. In a system as defined in claim 8, each of said carriers being in the form of an open grate structure.

10. In a product conveying system, first and second stack means in adjacent relation each arranged for supporting a plurality of separate product carriers, each of said stack means defining a plurality of vertically aligned product carrier stations including lowermost and uppermost stations an a plurality of intermediate stations, upward shuttle means associated with said first stack means for simultaneously shifting each carrier therein upwardly to the next higher station, upper transverse shuttle means for shifting a carrier from the uppermost station of said first stack means to the uppermost station of said second stack means, downward shuttle means associated with said second stack means for simultaneously shifting each carrier thereof downwardly to the next lower station, and lower transverse shuttle means for shifting a carrier from the lowermost station of said second stack means to the lowermost station of said first stack means, said upward shuttle means comprising vertically reciprocable frame means, servicing fingers carried by said frame means for operating during upward movement of said frame means to lift each carrier from one station to a next higher station.

11. In a system as defined in claim 10, means for effecting movement of said servicing fingers during downward movement of said frame means to clear the respective carriers during said downward movement.

12. In a system as defined in claim 11, said movement-effecting means comprising cam and cam follower means.

13. In a system as defined in claim 10, a plurality of vertical rod means each arranged to support a plurality of said servicing fingers in vertically spaced relation thereon, each of said vertical rod means being pivotal about a vertical axis during downward movement of said frame means to cause said fingers thereon to clear the respective carriers.

14. In a system as defined in claim 13, pilot finger means carried by said vertical rod means, and cam means engagable by said pilot finger means to effect pivotal movement of said vertical rod means.

15. In a system as defined in claim 14, said cam means being pivotally supported and being urged to predetermined positions, said cam means being pivotal by said pilot finger means out of said positions during upward movement of said frame means and being then ineffective to move said pilot finger means, and said cam means being held in said predetermined positions during downward movement of said frame means to camminingly effect movement of said pilot finger means.

16. In a product conveying system, first and second stack means in adjacent relation each arranged for supporting a plurality of separate product carriers, each of said stack means defining a plurality of vertically aligned product carrier stations including lowermost and uppermost staions and a plurality of intermediate stations, upward shuttle means associated with said first stack means for simultaneously shifting each carrier therein upwardly to the next higher station, upper transverse shuttle means for shifting a carrier from the uppermost station of said first stack means to the uppermost station of said second stack means, downward shuttle means associated with said second stack means for simultaneously shifting each carrier thereof downwardly to the next lower station, and lower transverse shuttle means for shifting a carrier from the lowermost station of said second track means to the lowermost station of said first stack means, said upward shuttle means comprising station fingers for supporting a carrier in each of said stations of said first stack means, and means for effecting outward movement of said station fingers to allow movement of each carrier to a next higher position.

17. In a system as defined in claim 16, a plurality of vertical rod means, each arranged to support a plurality of said station fingers in vertically spaced relation thereon.

18. In a system as defined in claim 17, pilot finger means carried by said vertical rod means, vertically reciprocable frame means, and cam means carried by said frame means for actuating said pilot finger means.

19. In a system as defined in claim 18, servicing finger means carried by said frame means for lifting each carrier of said first stack means from one station to a next higher station.

20. In a product conveying system, first and second stack means in adjacent relation each arranged for supporting a plurality of separate product carriers, each of said stack means defining a plurality of vertically aligned product carrier stations including lowermost and uppermost stations and a plurality of intermediate stations, upward shuttle means associated with said first stack means for simultaneously shifting each carrier therein upwardly to the next higher station, upper transverse shuttle means for shifting a carrier from the uppermost station of said first stack means to the uppermost station of the second stack means, downward shuttle means associated with said second stack means for simultaneously shifting each carrier thereof downwardly to the next lower station, and lower transverse shuttle means for shifting a carrier from the lowermost station of said first stack means, said downward shuttle means comprising a vertically reciprocable frame, and servicing finger means on said frame for lowering each carrier in said second stack means from one station to a next lower station.

21. In a system as defined in claim 20, means operative to effect movement of said servicing fingers to allow clearing of the carriers during an initial portion of upward movement of said vertically reciprocable frame.

22. In a system as defined in claim 21, station finger means for temporarily supporting said carriers during clearing of said carriers by said servicing finger means.

23. In a product conveying system, first and second stack means in adjacent relation each arranged for supporting a plurality of separate product carriers, each of said stack means defining a plurality of vertically aligned product carrier stations including lowermost and uppermost stations and a plurality of intermediate stations, upward shuttle means associated with said first stack means for simultaneously shifting each carrier therein upwardly to the next higher station, upper transverse shuttle means for shifting a carrier from the uppermost station of said first stack means to the uppermost station of said second stack means, downward shuttle means associated with said second stack means for simultaneously shifting each carrier thereof downwardly to the next lower station, lower transverse shuttle means for shifting a carrier from the lowermost station of said second stack means to the lowermost station of said first stack means, back-up bar means associated with one of said transverse shuttle means for removing product from a carrier shifted by said one of said transverse shuttle means, and unloading conveyor means for receiving the product so removed, said unloading conveyor means having a generally horizontal product receiving surface underlying the carrier shifted by said one of said transverse shuttle means and operative to move said product receiving surface in a direction opposite the direction of shifting movement of said carrier.

* * * * *

UNITED STATES PATENT OFFICE
CERTIFICATE OF CORRECTION

Patent No. 3,763,991          Dated October 9, 1973

Inventor(s) Otto J. Bachtik

It is certified that error appears in the above-identified patent and that said Letters Patent are hereby corrected as shown below:

On the cover sheet item [76] should read as follows:

-- Otto J. Bachtik  2005 South Finley Road, Lombard, Ill. 60148 --.

Signed and sealed this 30th day of April 1974.

(SEAL)
Attest:

EDWARD M.FLETCHER,JR.                    C. MARSHALL DANN
Attesting Officer                        Commissioner of Patents